(12) United States Patent
Frolikov

(10) Patent No.: US 11,003,576 B2
(45) Date of Patent: *May 11, 2021

(54) NAMESPACE CHANGE PROPAGATION IN NON-VOLATILE MEMORY DEVICES

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/236,897

(22) Filed: Dec. 31, 2018

(65) Prior Publication Data

US 2019/0146912 A1    May 16, 2019

Related U.S. Application Data

(63) Continuation of application No. 15/814,634, filed on Nov. 16, 2017, now Pat. No. 10,223,254.

(51) Int. Cl.
  *G06F 12/02* (2006.01)
  *G06F 3/06* (2006.01)
  *G06F 12/0884* (2016.01)
  *G06F 12/0811* (2016.01)

(52) U.S. Cl.
  CPC ......... *G06F 12/0246* (2013.01); *G06F 3/061* (2013.01); *G06F 3/064* (2013.01); *G06F 3/0608* (2013.01); *G06F 3/0673* (2013.01); *G06F 3/0679* (2013.01); *G06F 12/0811* (2013.01); *G06F 12/0884* (2013.01); *G06F 2212/7201* (2013.01)

(58) Field of Classification Search
  None
  See application file for complete search history.

(56) References Cited

U.S. PATENT DOCUMENTS

| 5,430,856 A | 7/1995 | Kinoshita |
| 6,529,921 B1 | 3/2003 | Berkowitz et al. |
| 8,498,417 B1 | 7/2013 | Harwood et al. |
| 8,738,621 B2 | 5/2014 | Hinrichs |

(Continued)

OTHER PUBLICATIONS

International Search Report and Written Optinion, Int. Pat. App. Ser. PCT/US2018/059377, dated Feb. 21, 2019.

(Continued)

*Primary Examiner* — Yaima Rigol
(74) *Attorney, Agent, or Firm* — Greenberg Traurig

(57) ABSTRACT

A computer storage device having a host interface, a controller, non-volatile storage media, and firmware. The firmware instructs the controller to: generate mapping data defining mapping, from logical block addresses in namespaces configured on the non-volatile storage media, to logical block addresses in a capacity of the non-volatile storage media; maintain an active copy of the mapping data; generate cached copies of the mapping data from the active copy; generate a shadow copy from the active copy; implement changes in the shadow copy; after the changes are made in the shadow copy, activate the shadow copy and simultaneously deactivate the previously active copy; and update the cached copies according to the newly activated copy, as a response to the change in active copy identification.

20 Claims, 17 Drawing Sheets

(56) References Cited

U.S. PATENT DOCUMENTS

| | | | |
|---|---|---|---|
| 8,862,590 | B2 | 10/2014 | Sheehan |
| 9,116,904 | B2 | 8/2015 | Christiansen et al. |
| 9,430,480 | B1* | 8/2016 | Bono .................... G06F 3/0635 |
| 9,501,392 | B1 | 11/2016 | Weingarten |
| 9,529,735 | B2 | 12/2016 | Hashimoto |
| 10,223,254 | B1 | 3/2019 | Frolikov |
| 10,437,476 | B2 | 10/2019 | Frolikov |
| 10,503,404 | B2 | 12/2019 | Frolikov |
| 10,642,488 | B2 | 5/2020 | Frolikov |
| 10,678,703 | B2 | 6/2020 | Frolikov |
| 2004/0236924 | A1 | 11/2004 | Johnson et al. |
| 2005/0108269 | A1 | 5/2005 | Szajdecki et al. |
| 2008/0109662 | A1 | 5/2008 | Natarajan et al. |
| 2009/0007162 | A1 | 1/2009 | Sheehan |
| 2009/0092252 | A1 | 4/2009 | Noll et al. |
| 2009/0198899 | A1 | 8/2009 | Revanuru |
| 2010/0036889 | A1* | 2/2010 | Joshi .................... G06F 16/182 |
| | | | 707/821 |
| 2010/0095057 | A1 | 4/2010 | Li et al. |
| 2010/0191779 | A1 | 7/2010 | Hinrichs |
| 2010/0262583 | A1 | 10/2010 | van Ingen et al. |
| 2010/0268872 | A1 | 10/2010 | Lee et al. |
| 2010/0318760 | A1 | 12/2010 | So et al. |
| 2011/0022566 | A1 | 1/2011 | Beaverson et al. |
| 2011/0106771 | A1 | 5/2011 | McDonald et al. |
| 2012/0272037 | A1 | 10/2012 | Bayer et al. |
| 2013/0080732 | A1 | 3/2013 | Nellans et al. |
| 2014/0280392 | A1 | 9/2014 | Christiansen et al. |
| 2014/0281040 | A1 | 9/2014 | Liu |
| 2014/0310499 | A1 | 10/2014 | Sundararaman et al. |
| 2015/0012538 | A1 | 1/2015 | Sheehan |
| 2015/0242309 | A1 | 8/2015 | Talagala et al. |
| 2015/0278397 | A1 | 10/2015 | Hendrickson et al. |
| 2015/0319243 | A1* | 11/2015 | Hussain ................ G06F 3/0665 |
| | | | 709/217 |
| 2016/0124843 | A1 | 5/2016 | Kanno |
| 2016/0283125 | A1 | 9/2016 | Hashimoto et al. |
| 2016/0342463 | A1 | 11/2016 | Oshima |
| 2017/0024137 | A1 | 1/2017 | Kanno |
| 2017/0149924 | A1* | 5/2017 | Peterson ............. G06F 12/0804 |
| 2017/0242617 | A1 | 8/2017 | Walsh et al. |
| 2017/0262175 | A1 | 9/2017 | Kanno |
| 2017/0344430 | A1* | 11/2017 | Greer .................... G06F 11/1456 |
| 2017/0351431 | A1 | 12/2017 | Dewitt et al. |
| 2018/0018917 | A1 | 1/2018 | Yoo et al. |
| 2018/0024920 | A1 | 1/2018 | Thomas et al. |
| 2018/0088805 | A1 | 3/2018 | Kanno |
| 2018/0088811 | A1 | 3/2018 | Kanno |
| 2018/0089101 | A1 | 3/2018 | Sternberg et al. |
| 2018/0121344 | A1 | 5/2018 | Seo et al. |
| 2018/0239697 | A1 | 8/2018 | Huang et al. |
| 2018/0260319 | A1 | 9/2018 | Thompson et al. |
| 2018/0260334 | A1 | 9/2018 | Asano et al. |
| 2018/0275871 | A1 | 9/2018 | Ptak |
| 2018/0275873 | A1 | 9/2018 | Frid et al. |
| 2019/0121543 | A1 | 4/2019 | Frolikov |
| 2019/0121547 | A1 | 4/2019 | Frolikov |
| 2019/0121548 | A1 | 4/2019 | Frolikov |
| 2019/0146907 | A1 | 5/2019 | Frolikov |
| 2019/0146927 | A1 | 5/2019 | Frolikov |
| 2019/0146931 | A1 | 5/2019 | Frolikov |
| 2019/0347010 | A1 | 11/2019 | Frolikov |
| 2019/0361610 | A1 | 11/2019 | Frolikov |
| 2020/0257449 | A1 | 8/2020 | Frolikov |

OTHER PUBLICATIONS

International Search Report and Written Opinion, Int. App. No. PCT/US2018/056076, dated Jan. 30, 2019.
U.S. Appl. No. 15/790,979, filed Oct. 23, 2017, Alex Frolikov, Docketed New Case—Ready for Examination, dated Nov. 26, 2017.
U.S. Appl. No. 15/790,882, filed Oct. 23, 2017, Alex Frolikov, Docketed New Case—Ready for Examination, dated Nov. 26, 2017.
U.S. Appl. No. 15/814,634, filed Nov. 16, 2017, Alex Frolikov, Notice of Allowance dated Oct. 29, 2018, Application Received in Office of Publications.
U.S. Appl. No. 15/790,969, filed Oct. 23, 2017, Alex Frolikov, Docketed New Case—Ready for Examination, dated Nov. 26, 2017.
U.S. Appl. No. 15/814,679, filed Nov. 16, 2017, Alex Frolikov, Docketed New Case—Ready for Examination, dated Jan. 12, 2018.
U.S. Appl. No. 15/814,785, filed Nov. 16, 2017, Alex Frolikov, Docketed New Case—Ready for Examination, dated Dec. 20, 2017.
U.S. Appl. No. 15/814,934, filed Nov. 16, 2017, Alex Frolikov, Non Final Action dated Oct. 26, 2018.
Dave Minturn, J. Metz, "Under the Hood with NVMe over Fabrics", Dec. 15, 2015.
Hermann Strass, "An Introduction to NVMe", copyrighted 2016.
J. Metz, Creating Higher Performance Solid State Storage with Non-Volatile Memory Express (NVMe), SNIA, Data Storage Innovation Conference, 2015.
Kevin Marks, "An NVM Express Tutorial", Flash Memory Summit 2013, created on Aug. 7, 2013.
NVM Express, Revision 1.2, Nov. 3, 2014.

* cited by examiner

US 11,003,576 B2

NAMESPACE CHANGE PROPAGATION IN NON-VOLATILE MEMORY DEVICES

RELATED APPLICATIONS

The present application is a continuation application of U.S. patent application Ser. No. 15/814,634, filed Nov. 16, 2017 and entitled "Namespace Change Propagation in Non-Volatile Memory Devices," the entire disclosure of which application is hereby incorporated herein by reference.

FIELD OF THE TECHNOLOGY

At least some embodiments disclosed herein relate to computer storage devices in general and more particularly, but not limited to namespace change propagation in non-volatile storage devices.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
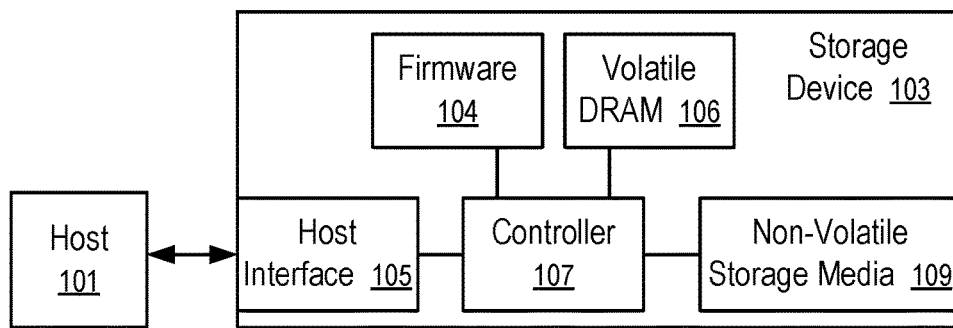
FIG. 1 shows a computer system in which embodiments of inventions disclosed herein can be implemented.

At least some embodiments disclosed herein provide efficient and flexible ways to implement logical storage allocations and management in storage devices.

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

A host computer of the storage device may send a request to the storage device for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

There are challenges in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes. For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

At least some embodiments of the inventions disclosed herein address the challenges through a block by block map from LBA addresses defined in allocated namespaces to LBA addresses defined on the entire storage capacity of the storage device. After mapping the LBA addresses defined in allocated namespaces into the LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. A block of the predetermined block size may be referred to hereafter as an L-block, a full L-block, a full LBA block, an LBA block, or sometimes simply as a full block or a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Preferably, the block size of L-blocks is predetermined and is a power of two (2) to simplify computations involved in mapping of addresses for the L-blocks. In other instances, an optimized block size may be predicted or calculated, using an artificial intelligence technique, through machine learning from the namespace usage histories in the storage device and/or other similarly used storage devices.

To improve data access performance, multiple copies of LBA address mapping data for a namespace can be used by different processors of the controller and stored/cached at different memory locations in the computer storage device. One embodiment described herein provides a communication protocol for the propagation of mapping data changes to the multiple copies to avoid undesirable and/or inconsistent data access made via the namespace.

FIG. 1 shows a computer system in which embodiments of inventions disclosed herein can be implemented.

In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103), as further discussed below.

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

For example, the firmware (104) can be configured to use the techniques discussed below in managing namespaces. However, the techniques discussed below are not limited to being used in the computer system of FIG. 1 and/or the examples discussed above.

Figure 2:
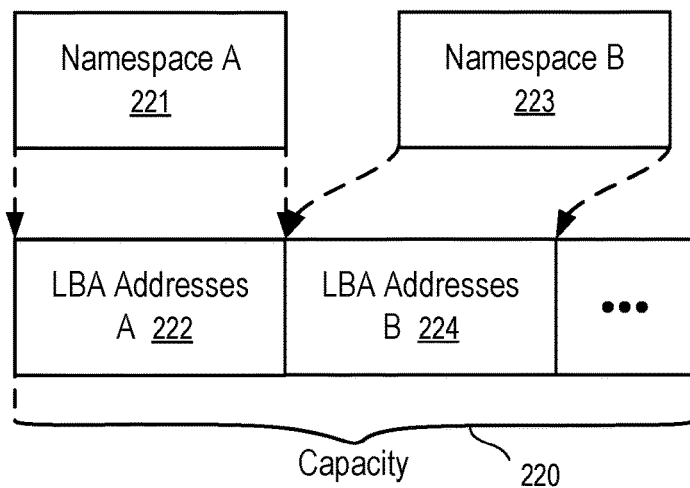
FIG. 2 illustrates an example of allocating multiple namespaces directly according to the requested sizes of the namespaces.

FIG. 2 illustrates an example of allocating multiple namespaces directly according to the requested sizes of the namespaces.

For example, the method of FIG. 2 can be implemented in the storage device (103) illustrated in FIG. 1. The non-volatile storage media (109) of the storage device (103) has memory units that may be identified by a range of LBA addresses (222, 224, . . . ), where the range corresponds to a memory capacity (220) of the non-volatile storage media (109).

In FIG. 2, namespaces (221, 223) are allocated directly from the contiguous, available region of the capacity (220). When one of the previously allocated namespaces (221, 223) is deleted, the remaining capacity (220), free for allocation to another namespace, may become fragmented, which limits the options for the selection of the size of a subsequent new namespace.

For example, when the namespace (221) illustrated in FIG. 2 is deleted and the namespace (223) remains to be allocated in a region as illustrated in FIG. 2, the free portions of the capacity (220) are fragmented, limiting the choices of the size of the subsequent new namespace to be the same as, or smaller than, the size of the namespace (221).

To improve the flexibility for dynamic namespace management and support iterations of creation and deletion of namespaces of different sizes, a block-wise mapping/allocation of logical addresses can be used, as further discussed below.

Figure 3:
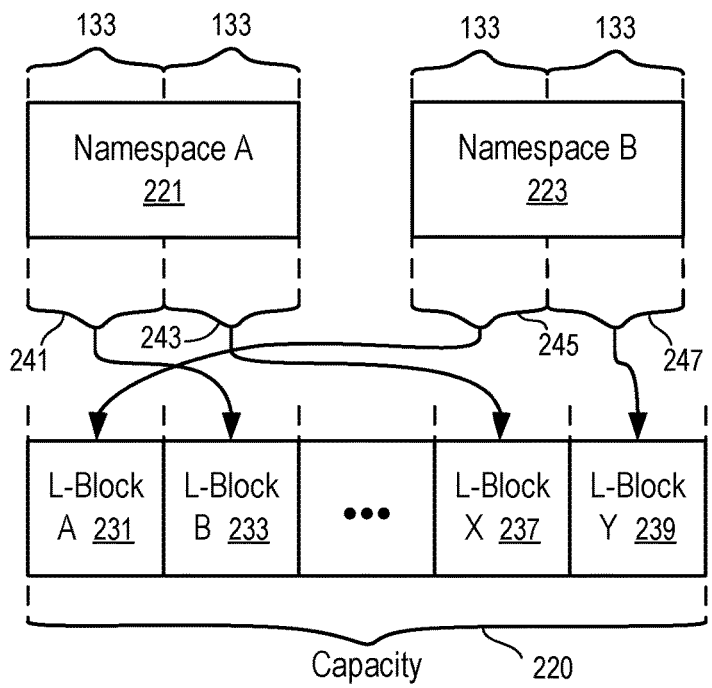
FIG. 3 illustrates an example of allocating namespaces via mapping blocks of logical addresses.

FIG. 3 illustrates an example of allocating namespaces via mapping blocks of logical addresses.

In FIG. 3, the capacity (220) of the storage device (103) is divided into L-blocks, or blocks (231, 233, . . . , 237, 239) of LBA addresses that are defined on the entire capacity of the storage device (103). To improve efficiency in address mapping, the L-blocks (231, 233, . . . , 237, 239) are designed to have the same size (133). Preferably, the block size (133) is a power of two (2), such that operations of division, modulo, and multiplication involving the block size (133) can be efficiently performed via shift operations.

After the capacity (220) is divided into L-blocks (231, 233, . . . , 237, 239) illustrated in FIG. 3, the allocation of a namespace (e.g., 221 or 223) does not have to be from a contiguous region of the capacity (220). A set of L-blocks (231, 233, . . . , 237, 239) from non-contiguous regions of the capacity (220) can be allocated from a namespace (e.g., 221 or 223). Thus, the impact of fragmentation on the size availability in creating new namespaces, which impact may result from the deletion of selected previously-created namespaces, is eliminated or reduced.

For example, non-contiguous L-blocks (233 and 237) in the capacity (220) can be allocated to contiguous regions (241 and 243) of the namespace (221) through block-wise mapping; and non-contiguous L-blocks (231 and 239) in the capacity (220) can be allocated to contiguous regions (245 and 247) of the namespace (223) via block-wise mapping.

When the block size (133) is reduced, the flexibility of the system in dynamic namespace management increases. However, a reduced block size (133) also increases the number of blocks to be mapped, which decreases the computation efficiency in address mapping. An optimal block size (133) balances the tradeoff between flexibility and efficiency; and a particular block size (133) can be selected for the specific usage of a given storage device (103) in a specific computing environment.

Figure 4:
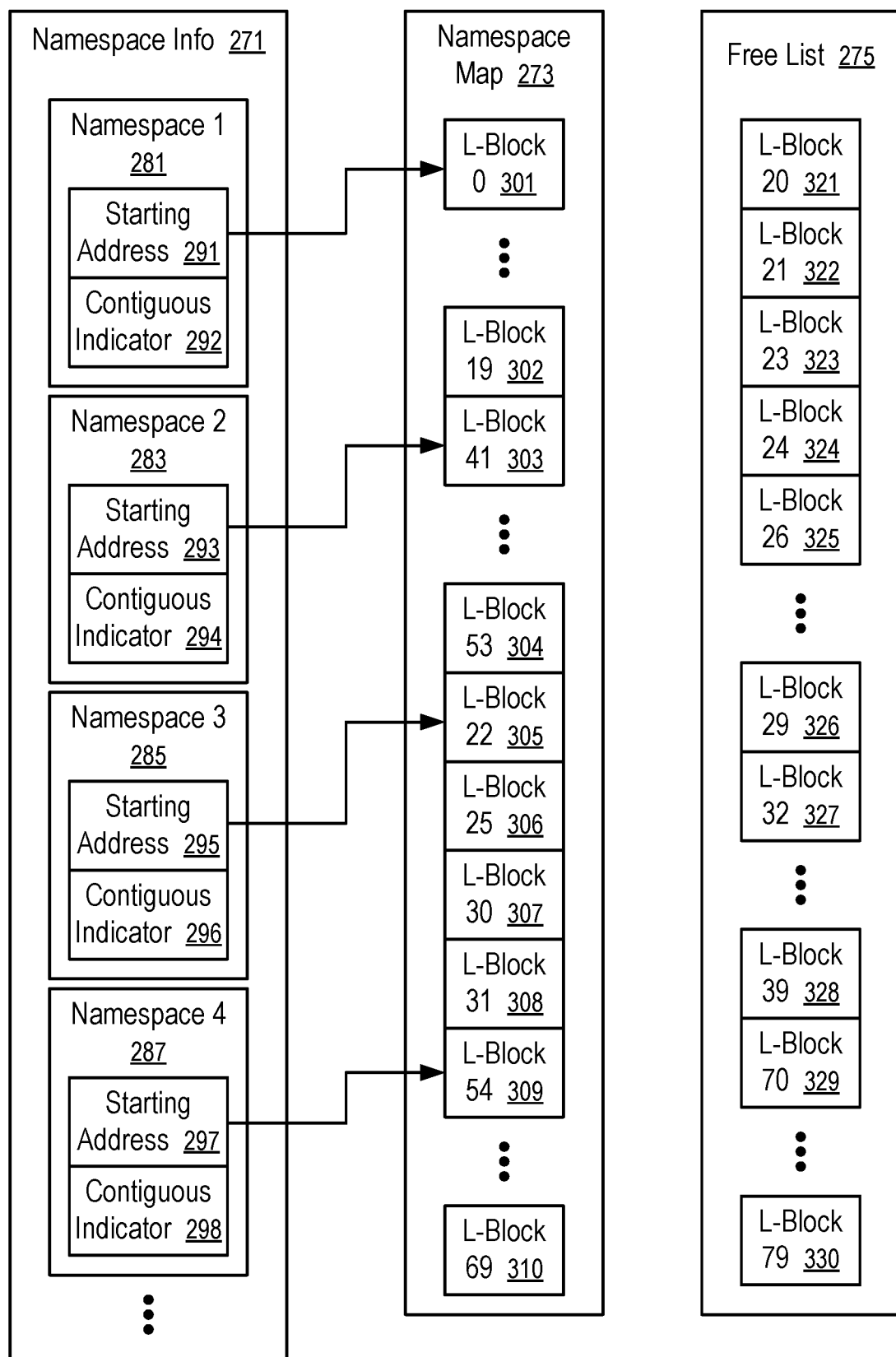
FIG. 4 illustrates an example of data structures for namespace mapping.

FIG. 4 illustrates an example of data structures for namespace mapping.

For example, the data structures for namespace mapping of FIG. 4 can be used to implement the block-wise address mapping illustrated in FIG. 3. The data structure of FIG. 4 is lean in memory footprint and optimal in computational efficiency.

In FIG. 4, a namespace map (273) stores an array of the identifications of L-blocks (e.g., 231, 233, . . . , 237, 239) that have been allocated to a set of namespaces (e.g., 221, 223) identified in namespace info (271).

In the array of the namespace map (273), the identifications of L-blocks (301, . . . , 302; 303, . . . , 304; 305, . . . 308; or 309, . . . , 310) allocated for each namespace (281, 283, 285, or 287) are stored in a contiguous region of the array. Thus, the portions of identifications of L-blocks (301, . . . , 302; 303, . . . , 304; 305, . . . 308; and 309, . . . , 310) allocated for different namespaces (281, 283, 285, and 287) can be told apart from the identification of the starting addresses (291, 293, 295, and 297) of the block identifications in the array.

Optionally, for each of the each namespaces (281, 283, 285, or 287), the namespace info (271) identifies whether or not the L-blocks (301, . . . , 302; 303, . . . , 304; 305, . . . 308; or 309, . . . , 310) allocated for the respective namespaces (281, 283, 285, or 287) is contiguous on the logical addresses in the capacity (220).

For example, when the capacity (220) is divided into 80 blocks, the L-blocks may be identified as L-blocks 0 through 79. Since contiguous blocks 0 through 19 (301 and 302) are allocated for namespace 1 (281), the contiguous indicator (292) of the namespace 1 (281) has a value indicating that the sequence of L-blocks, identified via the block identifiers starting at a starting address (291) in the array of the namespace map (273), occupy a contiguous region in the logical address space/capacity (220).

Similarly, L-blocks 41 through 53 (303 and 304) allocated for namespace 2 (283) are contiguous; and thus, a contiguous indicator (294) of the namespace 2 (283) has the value indicating that the list of L-blocks, identified via the block identifiers starting at a starting address (293) in the array of the namespace map (273), are in a contiguous region in the logical address space/capacity (220).

Similarly, L-blocks 54 through 69 (309 and 310) allocated for namespace 4 (287) are contiguous; and thus, a contiguous indicator (298) of the namespace 4 (287) has the value indicating that the list of blocks, identified via the block identifiers starting at a starting address (297) in the array of the namespace map (273) occupies a contiguous region in the logical address capacity (220). It is preferable, but not required, that the L-blocks allocated for a namespace are in a contiguous region in the mapped logical address space/capacity (220)

FIG. 4 illustrates that blocks 22, 25, 30 and 31 (305, 306, 307 and 308) allocated for namespace 3 (285) are non-contiguous; and a contiguous indicator (296) of the namespace 3 (285) has a value indicating that the list of blocks, identified via the block identifiers starting at a starting address (295) in the array of in the namespace map (273), is allocated from a non-contiguous regions in the mapped logical address space/capacity (220).

In some instances, a storage device (103) can allocate up to a predetermined number of namespaces. Null addresses can be used as starting addresses of namespaces that have not yet been allocated. Thus, the namespace info (271) has a predetermined data size that is a function of the predetermined number of namespaces allowed to be allocated on the storage device (103).

Optionally, the data structure includes a free list (275) that has an array storing the identifiers of L-blocks (321-325, . . . , 326-327, . . . , 328-329, . . . , 330) that have not yet been allocated to any of the allocated namespaces (281, 283, 285, 287) identified in the namespace info (271).

In some instances, the list of identifiers of L-blocks (321-330) in the free list (275) is appended to the end of the list of identifiers of L-blocks (301-310) that are currently allocated to the namespaces (281, 283, 285, 287) identified in the namespace info (271). A free block starting address field can be added to the namespace info (271) to identify the beginning of the list of identifiers of the L-blocks (321-330) that are in the free list (275). Thus, the namespace map (273) has an array of a predetermined size corresponding to the total number of L-blocks on the capacity (220).

Figure 5:
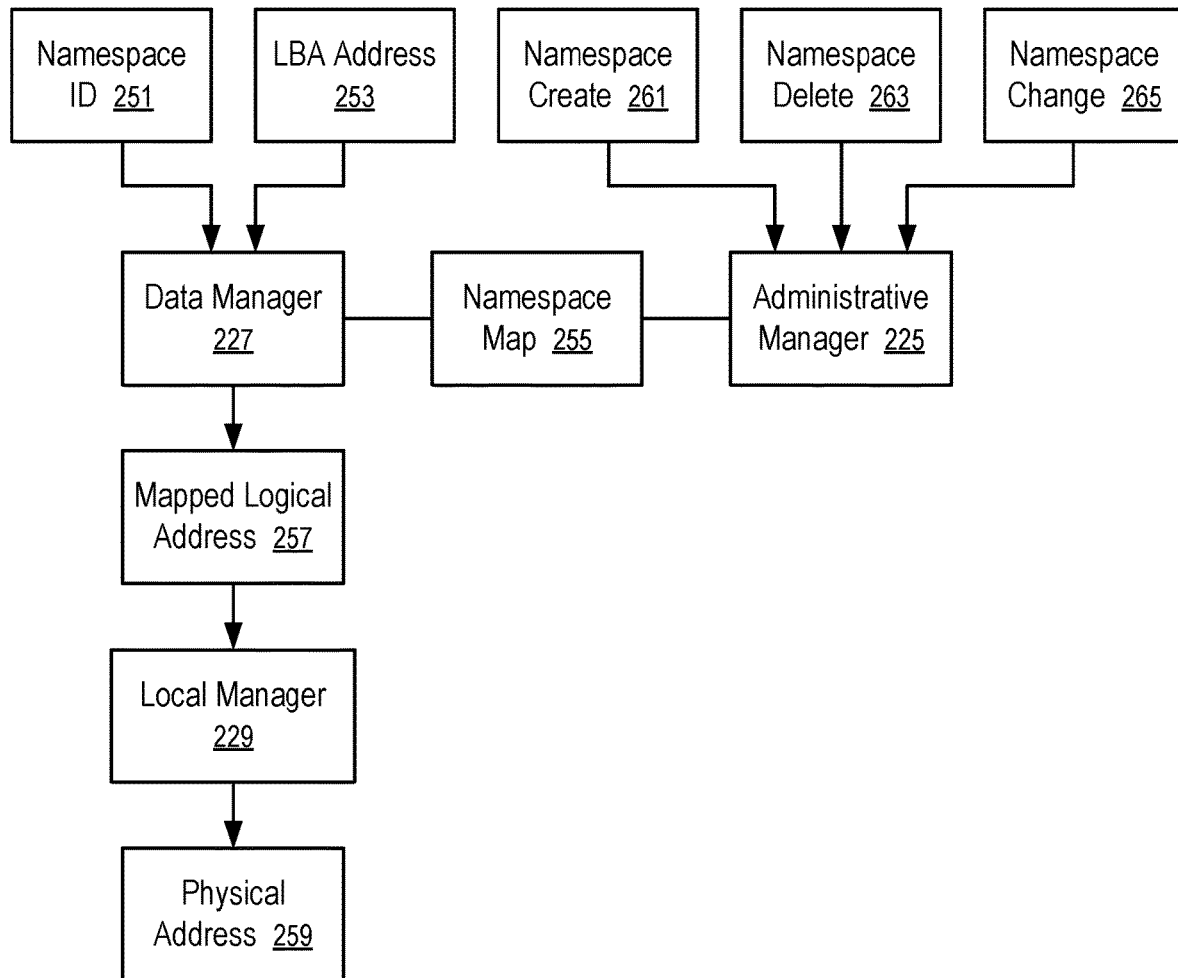
FIG. 5 shows a system to translate addresses in a non-volatile memory device to support namespace management.

FIG. 5 shows a system to translate addresses in a non-volatile memory device to support namespace management. For example, the system of FIG. 5 can be implemented using a storage device (103) illustrated in FIG. 1, a logical address mapping technique illustrated in FIG. 3, and a data structure similar to that illustrated in FIG. 4.

In FIG. 5, an administrative manager (225), a data manager (227) (or referred to as an I/O manager), and a local manager (229) are implemented as part of the firmware (e.g., 104) of a storage device (e.g., 103 illustrated in FIG. 1).

The administrative manager (225) receives commands (e.g., 261, 263, 265) from the host (e.g., 101 in FIG. 1) to create (261), delete (263), or change (265) a namespace (e.g., 221 or 223). In response, the administrative manager (225) generates/updates a namespace map (255), such as the namespace map (273) to implement the mapping illustrated in FIG. 2 or 9. A namespace (e.g., 221 or 223) may be changed to expand or shrink its size (e.g., by allocating more blocks for the namespace, or returning some of its blocks to the pool of free blocks).

The data manager (227) receives data access commands. A data access request (e.g., read, write) from the host (e.g., 101 in FIG. 1) identifies a namespace ID (251) and an LBA address (253) in the namespace ID (251) to read, write, or erase data from a memory unit identified by the namespace ID (251) and the LBA address (253). Using the namespace map (255), the data manager (227) converts the combination of the namespace ID (251) and the LBA address (253) to a mapped logical address (257) in the corresponding L-block (e.g., 231, 233, . . . , 237, 239).

The local manager (229) translates the mapped logical address (257) to a physical address (259). The logical addresses in the L-block (e.g., 231, 233, . . . , 237, 239) can be mapped to the physical addresses (259) in the storage media (e.g., 109 in FIG. 1), as if the mapped logical addresses (257) were virtually allocated to a virtual namespace that covers the entire non-volatile storage media (109).

Thus, the namespace map (255) can be seen to function as a block-wise map of logical addresses defined in a current set of namespaces (221, 223) created/allocated on the storage device (103) to the mapped logical addresses (257) defined on the virtual namespace. Since the virtual namespace does not change when the current allocation of the current set of namespaces (221, 223) changes, the details of the current namespaces (221, 223) are completely shielded from the local manager (229) in translating the mapped logical addresses (e.g., 257) to physical addresses (e.g., 259).

Preferably, the implementation of the namespace map (255) is lean in memory footprint and optimal in computational efficiency (e.g., using a data structure like the one illustrated in FIG. 4).

In some instances, the storage device (103) may not have a storage capacity (220) that is a multiple of a desirable block size (133). Further, a requested namespace size may not be a multiple of the desirable block size (133). The administrative manager (225) may detect the misalignment of the desirable block size (133) with the storage capacity (220) and/or the misalignment of a requested namespace size with the desirable block size (133), causing a user to adjust the desirable block size (133) and/or the requested namespace size. Alternatively or in combination, the administrative manager (225) may allocate a full block to a portion of a misaligned namespace and/or not use a remaining part of the allocated full block.

Figure 6:
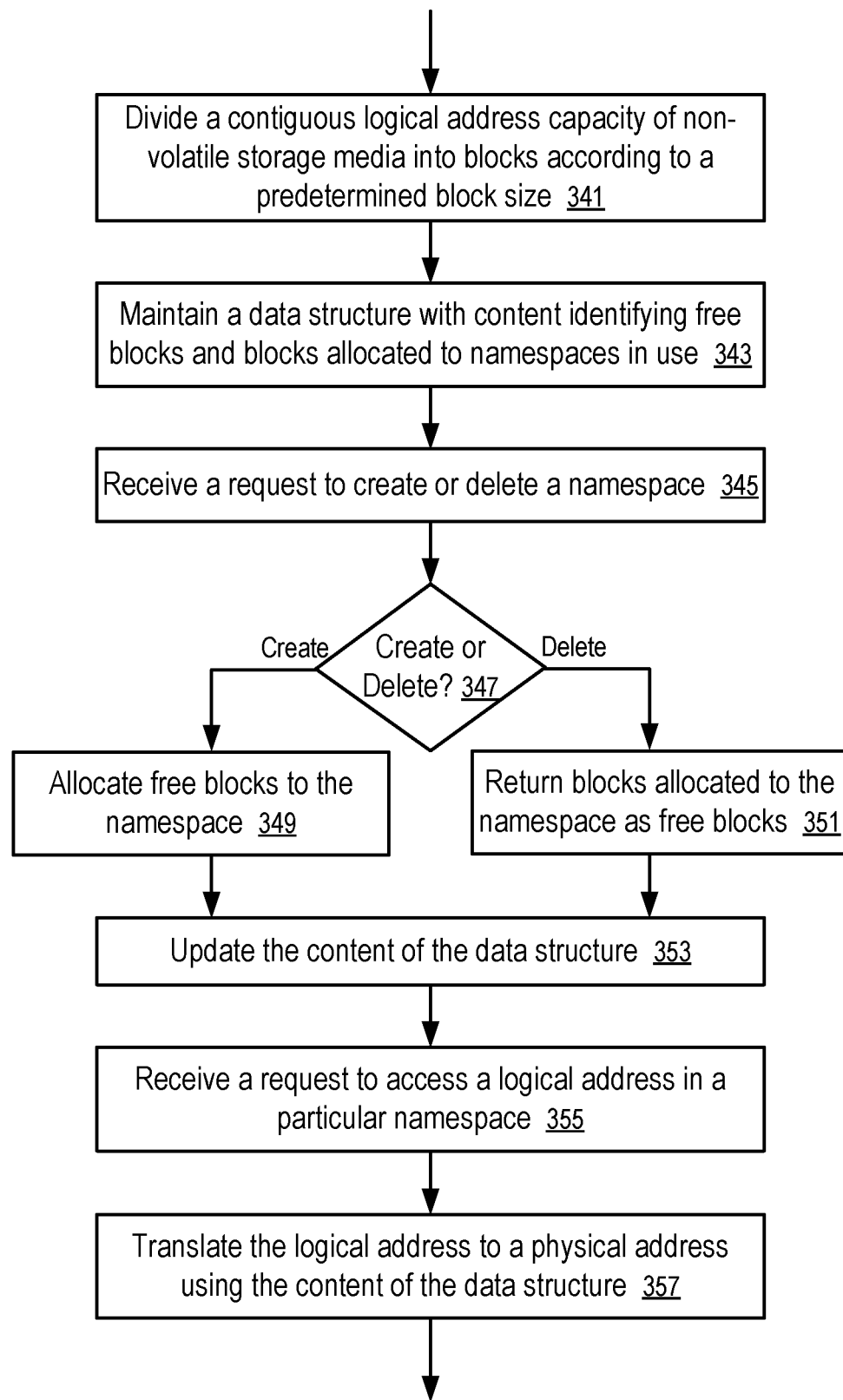
FIG. 6 shows a method to manage namespaces based on blocks of logical addresses.

FIG. 6 shows a method to manage namespaces based on blocks of logical addresses. For example, the method of FIG. 6 can be implemented in a storage device (103) illustrated in FIG. 1 using L-block techniques discussed above in connection with FIGS. 3-6.

In FIG. 6, the method includes: dividing (341) a contiguous logical address capacity (220) of non-volatile storage media (e.g., 109) into blocks (e.g., 231, 233, ..., 237, 239) according to a predetermined block size (133) and maintaining (343) a data structure (e.g., illustrated in FIG. 4) with content identifying free blocks (e.g., 312-330) and blocks (e.g., 301-310) allocated to namespaces (281-285) in use.

In response to receiving (345) a request that is determined (347) to create a new namespace, the method further includes allocating (349) a number of free blocks to the namespace.

In response to receiving (345) a request that is determined (347) to delete an existing namespace, the method further includes returning (351) the blocks previously allocated to the namespace to the free block list (275) as free blocks.

In response to the request to create or delete a namespace, the method further includes updating (353) the content of the data structure to identify the currently available free blocks (e.g., 312-330) and blocks (e.g., 301-310) allocated to currently existing namespaces (281-285).

In response to receiving (355) a request to access a logical address in a particular namespace, the method further includes translating (357) the logical address to a physical address using the content of the data structure.

For example, a storage device (103) illustrated in FIG. 1 has: a host interface (105); a controller (107); non-volatile storage media (109); and firmware (104) containing instructions which, when executed by the controller (107), instruct the controller (107) to at least: store a block size (133) of logical addresses; divide a logical address capacity (220) of the non-volatile storage media (109) into L-blocks (e.g., 231, 233, ..., 237, 239) according to the block size (133); and maintain a data structure to identify: a free subset of the L-blocks that are available for allocation to new namespaces (e.g., L-blocks 312-330); and an allocated subset of the L-blocks that have been allocated to existing namespaces (e.g., L-blocks 301-310). Preferably, the block size (133) is a power of two.

For example, the computer storage device (103) may be a solid state drive that communicates with the host (101) in accordance with a Non-Volatile Memory Host Controller Interface Specification (NVMHCI) for namespace management and/or access.

After the host interface (105) receives a request from a host (101) to allocate a particular namespace (221) of a quantity of non-volatile memory, the controller (107), executing the firmware (104), allocates a set of blocks (233 and 237) from the free subset to the particular namespace (221) and updates the content of the data structure. The set of blocks (233 and 237) allocated to the particular namespace (221) do not have to be contiguous in the logical address capacity (220), which improves the flexibility for dynamic namespace management.

Using the content of the data structure, the controller (107) executing the firmware (104) translates logical addresses defined in the first namespace the mapped logical addresses (257) and then to physical addresses (259) for the non-volatile storage media (109).

After the host interface (105) receives a request from the host (101) to delete (263) a particular namespace (221), the controller (107), executing the firmware (104), updates the content of the data structure to return the set of blocks (233 and 237) allocated to the particular namespace (221) from the allocated subset (e.g., 273) in the data structure to the free subset (e.g., 275) in the data structure.

Preferably, the data structure includes an array of identifications of blocks (301-310) in the allocated subset and pointers (291, 293, 295, 297) to portions (301-302, 303-304, 305-308, 309-310) of the array containing corresponding sets of identifications of blocks (301-310) that are allocated to respective ones of the existing namespaces (281, 283, 285, 287).

Optionally, the data structure further includes a set of indicators (292, 294, 296, 298) for the respective ones of the existing namespaces (281, 283, 285, 287), where each of the indicators (292, 294, 296, 298) indicating whether or not a respective set of identifications of blocks (301-302, 303-304, 305-308, 209-310) allocated to a corresponding one of the existing namespaces (281, 283, 285, 287) is contiguous in the logical address capacity (220) or space.

Optionally, the data structure includes an array of identifications of free blocks (321-330) in the free subset.

The logical address capacity (220) does not have to be a multiple of the block size (133). When the logical address capacity (220) is not a multiple of the block size (133), an L-block (e.g., 239) that is insufficient to be a full-size block may be not used.

The quantity of non-volatile memory requested for the creation (261) of a namespace (e.g., 221) does not have to be a multiple of the block size (133). When the quantity is not a multiple of the block size (133), one of the full blocks allocated to the namespace may not be fully utilized.

Figure 7:
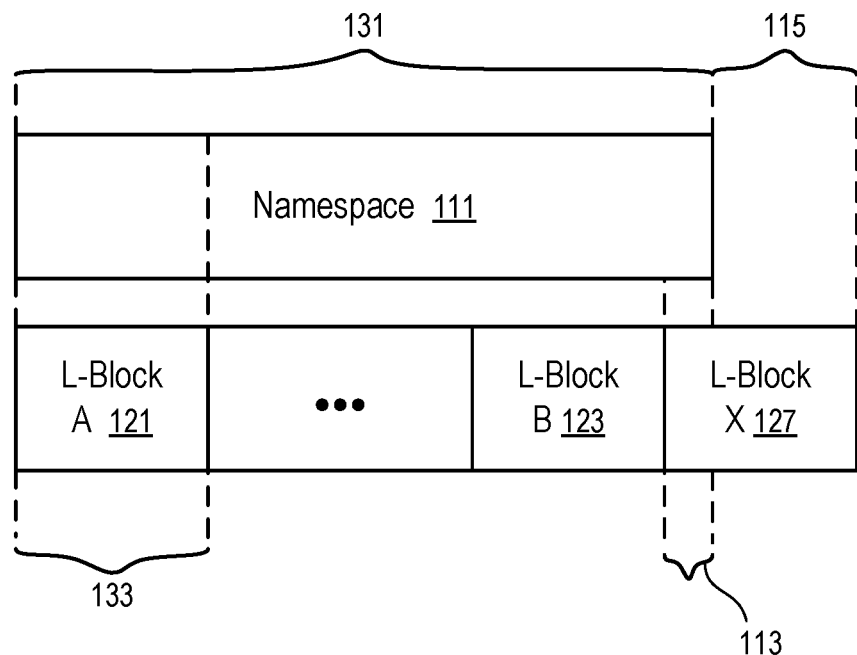
FIG. 7 shows an example diagram where a namespace is not aligned with block boundaries and can be implemented using the techniques of FIGS. 8-10.

FIG. 7 shows an example diagram where a namespace is not aligned with block boundaries and can be implemented using the techniques of FIGS. 8-11.

When a host (e.g., 101 in FIG. 1) requests the creation or reservation of a namespace (111) having a requested namespace size (131), a controller (e.g., 107 in FIG. 1) allocates a section of its non-volatile storage media (e.g., 109 in FIG. 1) to be addressed via LBA addresses under the namespace (111).

In a scenario illustrated in FIG. 7, the requested namespace size (131) is not the multiple of the block size (133). As a result, if the first LBA address in the namespace (111) representing a memory unit located in the namespace (111) is aligned with (e.g., mapped to) the first LBA address of an L-block (e.g., 121), the last LBA address in the namespace (111) cannot be aligned with (e.g., mapped to) the last LBA address of an L-block (e.g., 123), as illustrated in FIG. 7. Therefore, the namespace (111) is not aligned with boundaries of L-blocks for allocation. Since the requested namespace size (131) is not the multiple of the block size (133), the requested namespace size (131) is best satisfied by a number of full blocks (121, . . . , 123) and a portion (113) of a full block (127). The portion (113) is also referred to as a partial block (113).

In FIG. 7, the portion (113) of the full block (127) (or partial block (113)) is allocated for the namespace (111); and the remaining portion (115) of the full block (127) (or partial block (115)) is not allocated for the namespace (111). The remaining portion (115), or a portion of it, can be subsequently allocated to another namespace that also needs a partial block. Different namespaces may use different portions (e.g., 113, 115) of the full block (127).

Figure 8:
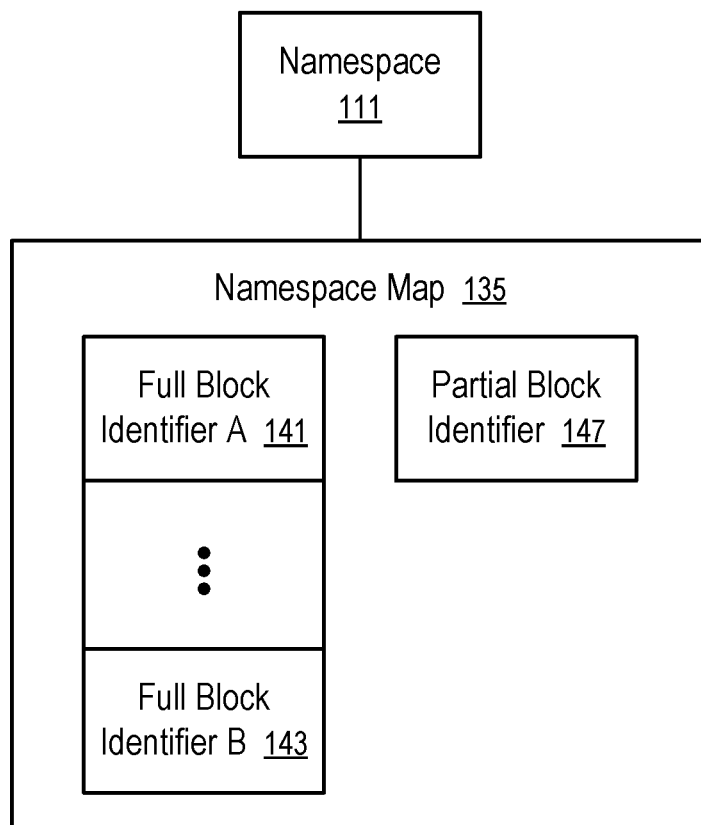
FIG. 8 illustrates an example block diagram of a namespace map to implement a namespace that is not aligned with block boundaries.

FIG. 8 illustrates an example block diagram of a namespace map to implement a namespace that is not aligned with block boundaries.

In FIG. 8, a namespace map (135) is linked to the namespace (111) to identify the blocks of LBA addresses allocated for the namespace (111). Any techniques for identification of the association of two items can be used to link the namespace map (135) to the namespace (111). For example, an identifier of the namespace map (135) can be stored in association with an identifier of the namespace (111) to link the namespace map (135) and the namespace (111). For example, a list of pointers corresponding to a list allocated namespaces can be used to identify the beginning memory locations of data structures of namespace maps to link the namespace maps with their namespaces. The addresses in the L-blocks (e.g., (121, . . . , 123)) can be further translated to the corresponding addresses of the physical storage locations by a separate layer of the firmware (104) (e.g., Flash Translation Layer (FTL) for solid state drives (SSDs)).

The namespace map (135) includes the identifiers (141, . . . , 143) of the full blocks (121, . . . , 123) allocated for the namespace (111) and an identifier (147) of a partial block (113) allocated for the namespace (111).

Since the full blocks (121, . . . , 123) have the same, predetermined block size (133), the list of full block identifiers (141, . . . , 143) can be identified using an array or list of the identifiers of starting units (or ending units) of the full blocks (121, . . . , 123). This arrangement simplifies the namespace map (135) and enables efficient address translation. However, the partial block (113) cannot be represented in such a way.

Figure 9:
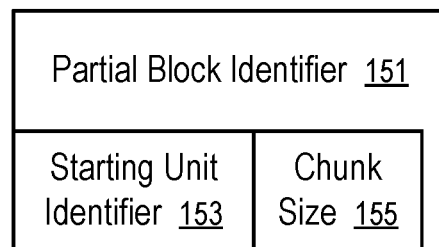
FIG. 9 illustrates an example partial block identifier that can be used to implement the namespace map of FIG. 8.

FIG. 9 illustrates an example partial block identifier that can be used to implement the namespace map of FIG. 8.

In FIG. 9, a partial block identifier (151) includes a starting unit identifier (153) and a chunk size (155). The starting unit identifier (153) is an identifier of the first logical memory unit in the partial block (e.g., 113 or 115) represented by the partial block identifier (151). When the partial block (113) is allocated on a chunk of memory units, the chunk size (155) represents the quantity of the memory units allocated to the partial block (113). Thus, the chunk size (155) can be added to the starting unit identifier (153) to compute the ending unit identifier, which is the last unit in the partial block (e.g., 113 or 115) represented by the partial block identifier (151). In combination, the partial block identifier (151) identifies a unique portion (e.g., 113 or 115) of a full block (e.g., 127). When the chunk size (155) is equal to the block size (133), the partial block identifier (151) actually represents a full block. So, a partial block identifier (151) can be used to represent a full block (which can be subsequently divided into multiple partial blocks (e.g., 113 or 115); and multiple contiguous partial blocks (e.g., 113 or 115) can be combined into a full block (e.g., 127).

For example, the partial block identifier (151), having the corresponding data specifying the starting unit identifier (153) and the chunk size (155) for the partial block (113), can be used as the partial block identifier (147) in the namespace map (135) of FIG. 8 to represent the partial block (113) in FIG. 7 allocated for the namespace (111).

For example, the partial block identifier (151), having the corresponding data specifying the starting unit identifier (153) and the chunk size (155) for the partial block (115), can be used to represent the unallocated partial block (115) in FIG. 7 that is free and available for allocation to another namespace. A linked list of unallocated partial blocks (e.g., 115) can be used to track a pool of free partial blocks.

Alternatively, the chunk size (155) in the partial block identifier (151) can be replaced with the ending unit identifier of the corresponding partial block. The partial block identifier (151) can also be equivalently represented by a combination of the chunk size (155) and the ending unit identifier.

Figure 10:
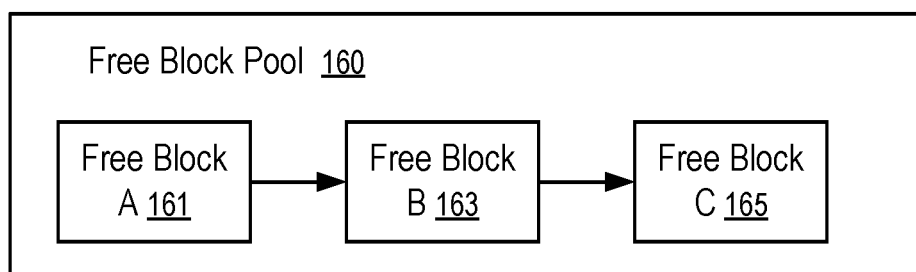
FIG. 10 illustrates an example data structure to manage a pool of free blocks available for namespace allocation using the technique of FIG. 8.

The controller (107), programmed by the firmware (104), stores data (e.g., in volatile DRAM (106) and/or non-volatile storage media (109)) to track a pool of free blocks using a linked list of partial blocks as illustrated in FIG. 10.

Preferably, each namespace map (135) uses no more than one partial block (113) for efficient address translation. However, in some instances, a namespace map (e.g., 135) may include multiple partial blocks (e.g., 113) when there is not a single free partial block (e.g., 113) to satisfy the request.

FIG. 10 illustrates an example data structure to manage a pool of free blocks available for namespace allocation using the technique of FIG. 8.

A data structure of a free block pool (160) includes identifiers of free blocks (161, 163, . . . , 165).

In one implementation, the free block pool (160) is used to track the available free partial blocks (e.g., 115) that can be allocated to new namespaces. Each of the free blocks (161, 163, . . . , 165) can be identified using the partial block identifier (151) illustrated in and/or discussed in connection with FIG. 9.

In some implementations, the free block pool (160) also optionally tracks the available free full blocks (161, 163, . . . , 165), where each of the full blocks are conveniently represented using the data structure of the partial block identifier (151) illustrated in FIG. 9, with the chunk size (155) being equal to the block size (133).

In other implementations, the free block pool (160) tracks the available free full blocks (161, 163, . . . , 165), using a list of full block identifiers in a way similar to the list of full block identifiers used in the namespace map (135), where each of the full block identifiers is presented by a representative unit identifier (e.g., a starting unit, or an ending unit), in view of the known, uniform block size (133) of the full blocks.

Figure 11:
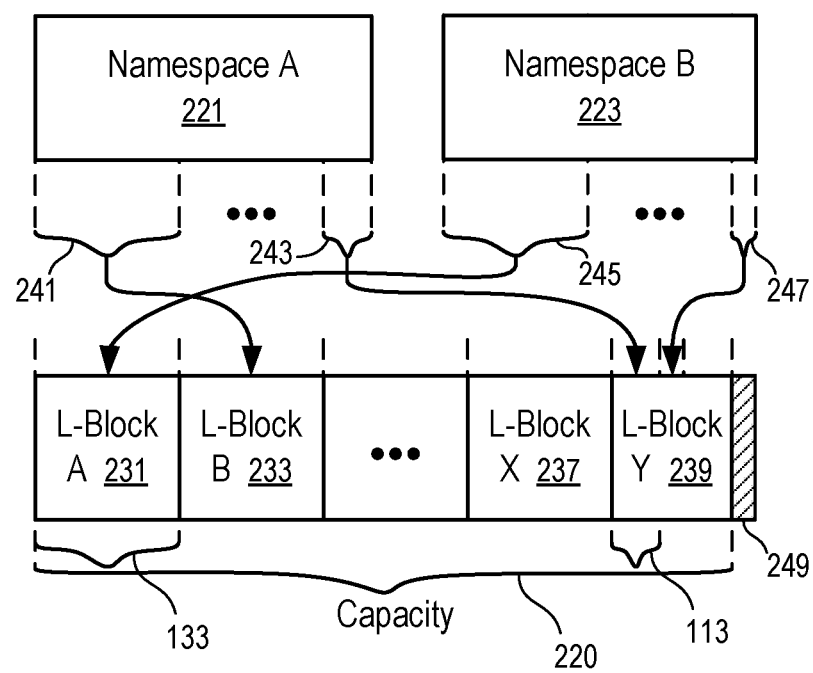
FIG. 11 illustrates an example of allocating namespaces using partial blocks.

The administrative manager (225) may use the partial block identification techniques discussed above in connection with FIGS. 7-10 to efficiently handle the mismatch of the requested namespace size (131) and/or the capacity (220) with the block size (133), with increased flexibility and minimum impact on address translation performance, as illustrated in FIG. 11.

FIG. 11 illustrates an example of allocating namespaces using partial blocks.

For example, the technique of FIG. 11 can be used to facilitate dynamic namespace management on the storage device (103) illustrated in FIG. 1 using the partial block identification techniques of FIGS. 8-10.

In FIG. 11, the storage capacity (220) of the non-volatile storage media (109) is divided into blocks of LBA addresses (L-blocks) (231, 233, . . . , 237) of the same size (e.g., 133 illustrated in FIG. 7), except that the last block (239) has a size smaller than the predetermined block size (133). In FIG. 11, the administrative manager (225) may virtually expand the last block (239) to include a virtual capacity (249) such that the last block (239) may also be viewed to have the same size (133). However, since the virtual capacity (249) is not available for allocation to any namespace, the administrative manager (225) puts the free portion of the last block (239) in a free block pool (160) as an available partial block (e.g., represented by a partial block identifier (151) of FIG. 9, as if the portion of the virtual capacity (249) had already been allocated to an existing namespace.

Preferably, the block size (133) is a power of two, which is advantageous in optimizing the computations involving the block size (133). For example, when the block size (133) is a power of two, operations of division, modulo, and/or multiplication involving the block size (133) can be simplified via shift operations.

The logical addresses in the L-blocks (231, 233, . . . , 237, 239) can be translated into physical addresses of the non-volatile storage media (109) independent from the allocation of namespaces (e.g., 221, 223) (e.g., by a flash translation layer of the firmware (104) of the storage device (103) configured as a solid state drive (SSD)).

Dividing the storage capacity (220) into the (L-blocks) (231, 233, . . . , 237), with a possible partial block (239), allows the dynamic management of namespaces at the block level. The logical addresses defined in the namespaces (e.g., 221, 223) are mapped to the L-blocks (231, 233, 237, 239) defined on the capacity (220) such that the namespace implementation details are shielded from the translation from the mapped logical address (257) in the L-blocks (231, 233, 237, 239) to the physical addresses (259) of the non-volatile storage media (109).

For example, a full size block (241) of logical addresses in namespace A (221) is linearly mapped into the mapped logical addresses (257) in one L-block (233). Similarly, a full size block (245) of logical addresses in namespace B (221) is linearly mapped into the mapped logical addresses (257) in another L-block (231). The block-wise mapping of logical addresses improves efficiency in the address translation.

When the sizes of the namespaces (221, 223) are not multiples of the block size (133), portions (243, 247) of the namespaces (221, 223) can be mapped to partial blocks of one or more full size blocks (e.g., 237) in a way as illustrated in FIGS. 7-11. The data structure of FIG. 4 can be modified to include a partial block identifier (147) of a partial L-block (113) allocated to a namespace (221) that has a last portion (e.g., 243) that is smaller than the predetermined block size (133), and to include a list of free partial blocks.

By maintaining a namespace map (e.g., 135 illustrated in FIG. 8, 273 illustrated in FIG. 4, which may be further modified to include partial block identifiers) and a free block pool (e.g., 160 illustrated in FIG. 10, 275 illustrated in FIG. 4, which may be further modified to include partial block identifiers), the controller (107) of the storage device (103) allows dynamic management of namespaces, where namespaces may be created/allocated when needed, deleted when no longer used, and/or resized, with fragmentation impact being reduced or eliminated. The mapping from the logical addresses in the namespace (e.g., 221, 223) to the logical addresses for translation to physical addresses can be dynamically adjusted in response to the commands from the host (101) to create/allocate, delete, and/or resize namespaces (e.g., shrink or expand).

Optionally, when the host (101) requests a namespace (e.g., 111, 221, or 223) that has a size not aligned with a block boundary, the host (101) may be prompted to revise the size of the namespace (e.g., 111, 221, or 223) for alignment with a block boundary.

Figure 12:
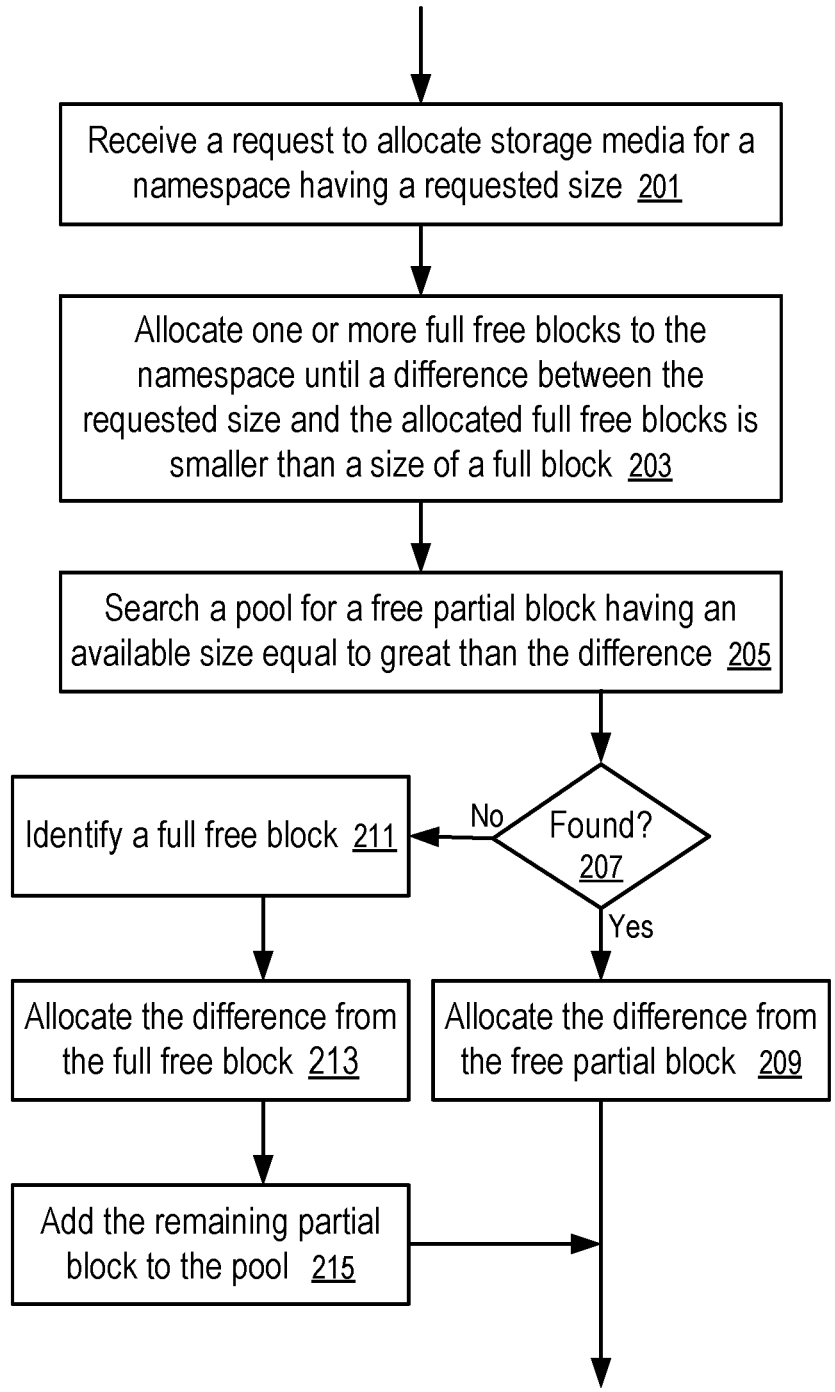
FIG. 12 shows a method to allocate a namespace on a storage device according to one embodiment.

FIG. 12 shows a method to allocate a namespace on a storage device according to one embodiment.

For example, the method of FIG. 12 can be implemented via executing the firmware (104) by the controller (107) of the storage device (103).

The method includes receiving (201) a request to allocate a portion of the non-volatile storage media (109) of the storage device (103) for a namespace (111) having a requested namespace size (131), which may or may not be a multiple of the size (133) of full L-blocks on the storage device (103).

In response to the request, the method further includes allocating (203) one or more full free L-blocks (121, . . . , and/or 123) to the namespace (111) until a difference between the requested namespace size (131) and the allocated one or more full free L-blocks (121, . . . , and/or 123) is smaller than the size (133) of a full L-block (e.g., 121, . . . , 123, or 127).

When the difference is smaller than the full block size (133), the method further includes searching (205) a free block pool (160) for one or more free partial blocks (161, 163, 165) having a total available size equal to or greater than the difference (113). Preferably, no more than one partial block is used for the difference.

If one or more free partial blocks (e.g., 161) that have a total size of available storage capacity equal to or greater than the difference (113) are found (207), the method further includes allocating (209) the difference (113) from the one or more free partial blocks (e.g., 161). If the available storage capacity is larger than the difference (113), the remaining unallocated one or more partial blocks are free and remain in the pool (160). If the available storage capacity is equal to the difference, the entirety of the one or more free partial blocks (e.g., 161) is allocated to the namespace (111) and thus removed from the free block pool (160).

If one or more free partial blocks having a total size of available storage capacity equal to or greater than the difference are not found (207), the method further includes: identifying (211) a full free block (e.g., 127); allocating (213) the difference (113) from the identified full free block (e.g., 127); and adding (215) the remaining partial block (115) of the identified full free block to the pool (160).

In some implementations, when there is no available full free block to successfully carry out the operation of identifying (211) a full free block for the difference, the method may report an error or warning, and/or attempt to use more than one free partial block (e.g., 161 and 163) to meet the difference.

When the namespace (111) is deleted, the partial block (113) allocated for the namespace (111) is freed and added to the free block pool (160); and full blocks (121, . . . , 123) allocated for the namespace (111) are also freed and become available for allocation to other namespaces. A routine of the firmware (104) detects and combines contiguous free partial blocks (e.g., 113 and 115) to reduce the numbers of partial free blocks in the pool (160). When partial free blocks (e.g., 113 and 115) in the pool (160) are combined into a full free block (127), the partial free blocks (e.g., 113 and 115) are converted into a free block representation (e.g., represented by the identification of a representative unit, such as a starting or ending unit).

For example, a computer storage device (103) of one embodiment includes: a host interface (105); a controller (107); and non-volatile storage media (109). The computer storage device (103) has firmware (104) containing instructions, which when executed by the controller (107), instruct the controller (107) to at least: receive, via the host interface (105), a request from a host (101) to allocate a namespace (111) of a requested namespace size (131) of non-volatile memory; generate, in response to the request, a namespace map (135) that identifies a plurality of L-blocks (121, . . . , 123), each having the same predetermined block size (133), and a partial L-block (113) having a size smaller than the predetermined block size (133); and convert, using the namespace map (135), logical addresses in the namespace (111) communicated from the host (101) to physical addresses (259) for the quantity of the non-volatile memory.

For example, the request to allocate the namespace (111) can be made using a protocol that is in accordance with Non-Volatile Memory Host Controller Interface Specification (NVMHCI) or NVMe.

For example, the computer storage device (103) can be a solid state drive (SSD).

For example, a method implemented in the computer storage device (103) includes receiving, in the controller (107) coupled with a non-volatile storage media (e.g., 109), a request from a host (101) to create or reserve a namespace (111) of a requested namespace size (131) of non-volatile memory from the non-volatile storage media (e.g., 109) of the computer storage device (103) (e.g., in accordance with NVMe). In response to the request, the method further includes generating, by the controller (107), a namespace map (135) that identifies: a plurality of L-blocks (121, . . . , 123) having a same predetermined block size (133), and a partial L-block (113) having a size smaller than the predetermined block size (133). The L-blocks (121, . . . , 123, 113) are further translated to specific portions of the non-volatile storage media (e.g., 109) (e.g., via a translation layer). After the namespace map (135) is generated for the namespace (111), the method further includes converting, by the controller (107) using the namespace map (135), logical addresses in the namespace (111) communicated from the host (101) to physical addresses for the quantity of the non-volatile memory.

Preferably, each of the plurality of L-blocks (121, . . . , 123) is represented in the namespace map (135) using a full block identifier (e.g., 141, . . . , or 143) that includes no more than an identification of a representative unit (e.g., a starting unit or an ending unit), in view of the known, uniform block size (133) of full blocks (121, . . . , 123, 127). Optionally, a full block identifier (e.g., 141, . . . , or 143) may include an indication of the block size (133) (e.g., by including both the identification of the starting unit, and the identification of the ending unit).

Preferably, the partial L-block (113) is represented in the namespace map (135) using an identifier (153) of a starting unit allocated for the namespace (111) and a chunk size (155). The starting unit is not necessarily the first unit in the full L-block (127) from which the partial block (113) is allocated. For example, when a subsequent namespace needs a partial block that has a size smaller than or equal to the remaining block (115), the partial block allocated for the subsequent namespace can have a starting unit that follows the ending unit of the partial block (113) in the L-block (127).

Alternatively, the partial L-block (113) can be represented in the namespace map (135) by an identification of an ending unit allocated for the namespace (111) (or another representative unit) and a chunk size (155).

Optionally, the method further includes maintaining, in the computer storage device (103), a free block pool (160) that identifies any partial L-block(s) (e.g., 127) available for allocation to another namespace.

Preferably, the computer storage device (103) stores a copy of the namespace map (135) and the free block pool (160) in the non-volatile storage media (e.g., 109) of the storage device (103) for persistent storage and uses a copy of the namespace map (135) and the free block pool (160) in the volatile DRAM (106) for computation.

As an example, generating the namespace map (135) can be performed via: allocating the plurality of L-blocks (121, . . . , 123) for the namespace (111) such that the size difference between the requested namespace size (131) of the namespace (111) and the plurality of L-blocks (121, . . . , 123) is smaller than the block size (133). After the determination of the difference between the quantity (133) of non-volatile memory requested for the namespace (111) and the total size of the plurality of full L-blocks (121, . . . , 123), the method further includes searching in the free block pool (160) for a partial L-block that is equal to or larger than the difference.

If a first partial L-block (e.g., 161), having a size larger than the difference, is found in the free block pool (160), the method further includes: allocating a portion of the first partial L-block (e.g., 161) for the namespace (111) (e.g., by creating a partial block identifier (147) for the namespace map (135)); and updating the first partial L-block (161) in the free block pool (160) to represent a remaining portion of first partial L-block (e.g., 161) that is not allocated for the namespace (111) and is free for allocation to another namespace.

If a first partial L-block (e.g., 161) having a size equal to the difference is found in the free block pool (160), the method further includes: removing the first partial L-block (e.g., 161) from the free block pool (160); and allocating the first partial L-block (e.g., 161) for the namespace (111).

If no partial L-block having a size equal to or larger than the difference is found in the free block pool (160), a full size free block (e.g., 127) may be allocated for the pool (160) and temporarily treated as a partial free block (e.g., 161). For example, the method further includes: adding a first L-block (e.g., 127) having the same predetermined block size (133) to the free block pool (160) (e.g., as the free block (161)); allocating a portion (113) of the first L-block for the namespace (111); and updating the first L-block (161) in the free block pool (160) to represent a remaining portion (115) of the first L-block (e.g., 127) that is not allocated for the namespace (111) and is free for allocation to another namespace.

Optionally, the method further includes receiving, in the controller (107), a request from the host (105) to delete the namespace (111), and adding, to the free block pool (160) by the controller (107) in response to the request, the partial L-block (113), identified by the partial block identifier (147) in the namespace map (135) of the namespace (111).

When the free block pool (160) has more than one partial free block (e.g., 113 and 115), the method optionally further includes: identifying, in the free block pool (160), contiguous free partial blocks (e.g., 113 and 115); and combining, in the free block pool (160), the contiguous free partial blocks (e.g., 113 and 115) into a single free partial block.

Optionally, the method further includes: after combining free partial blocks (e.g., 113 and 115) in the free block pool (160), determining whether a combined free partial block (e.g., 127) is a full free block that has the predetermined block size (133); and in response to a determination that the combined free partial block (e.g., 127) has the predetermined block size (133), removing the combined free partial block (e.g., 127) from the free block pool (160), such that the free block pool (160) contains only the identifications of partial free blocks; and free full blocks can be more efficiently represented by a list of full block identifiers, where each block in the free block pool (160) is represented by a partial block identifier having an identification of an unit in the block and a chunk size.

The techniques of allocating a namespace through namespace mapping of full and/or partial L-blocks, discussed above in connection with FIGS. 1-12, can be used to implement dynamic adjustment of namespace sizes, including namespace expansion, namespace reduction, and thin provisioning of namespaces, as further discussed below.

FIGS. 13-16 illustrate examples of adjusting sizes of namespaces through namespace mapping.

A namespace can be adjusted in size to add or remove an L-block of the predetermined block size (133).

Figure 13:
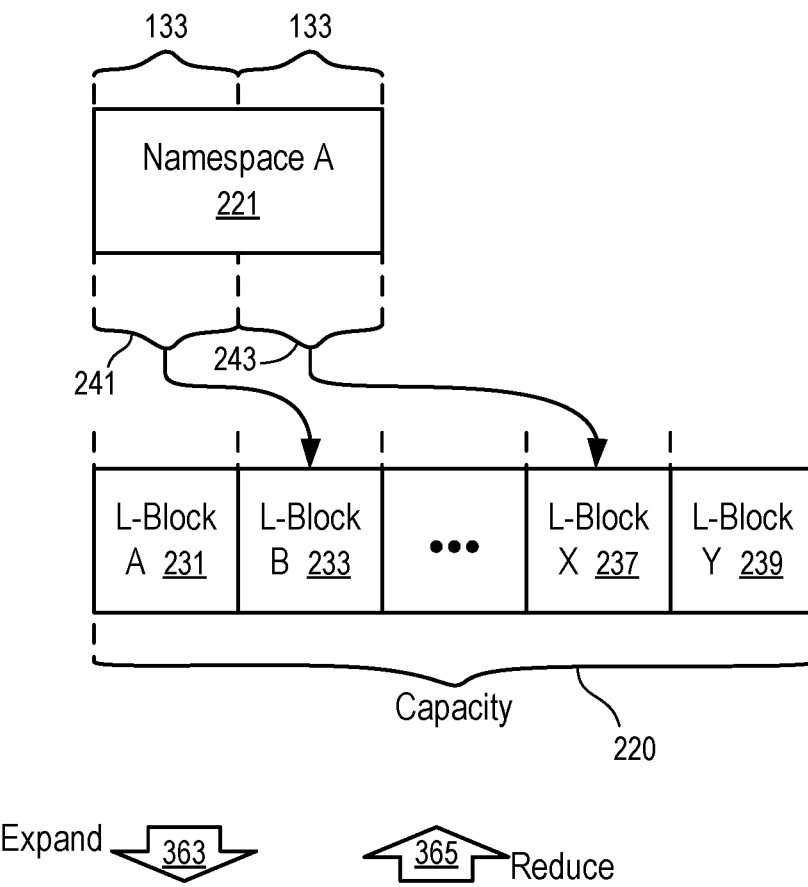
FIGS. 13-16 illustrate examples of adjusting sizes of namespaces through namespace mapping.
Figure 13:
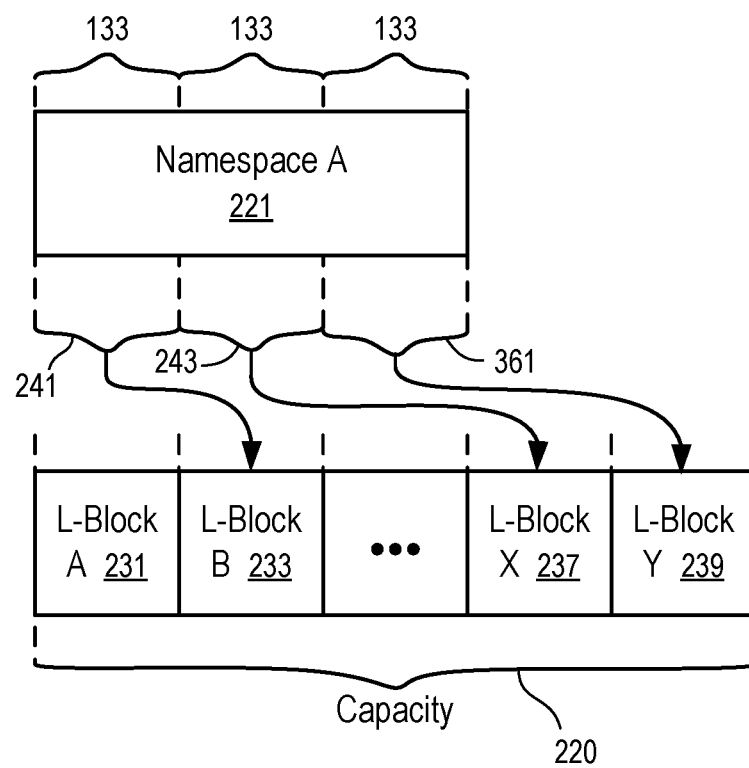

For example, FIG. 13 shows a name space (221) having blocks (241, 243) being mapped to L-blocks (233, 237) before being expanded (363) to have blocks (241, 243, 361) that are mapped to L-blocks (233, 237, 239) respectively.

To expand the namespace (221) by a block (361) having the predetermined block size (133), the namespace map (e.g., 273) of the namespace (221) is updated to include the identification of the L-block (239) that is allocated as the expanded capacity of the namespace (221).

For example, to expand the namespace (221) by a block (361), the controller (107) executing the firmware (104) identifies a free L-block (239) (e.g., from a free block pool (160) or the free list (275)) that has not yet been allocated to an existing namespace, and allocates the L-block (239) to the namespace (221) by including an identification of the L-block (239) in the namespace map (e.g., 135 or 273) of the namespace (221) and removing the identification of the L-block (239) from the free block pool and list (160 or 275).

In the reverse direction, FIG. 13 also shows a name space (221) having blocks (241, 243, 361) that are mapped to L-blocks (233, 237, 239) respectively before being reduced (365) to have blocks (241, 243) that are mapped to L-blocks (233, 237) respectively.

To shrink the namespace (221) by a block (361) having the predetermined block size (133), the namespace map (e.g., 273) of the namespace (221) is updated to remove the identification of the L-block (239) that corresponds to the removed capacity of the namespace (221).

For example, to shrink the namespace (221) by a block (361), the controller (107) executing the firmware (104) identifies the L-block (239) mapped to the last block (361) of the namespace (221) in the namespace map (e.g., 135 or 273) of the namespace (221), removes the identification of the L-block (239) from the namespace map (e.g., 135 or 273) of the namespace (221), and adds the identification of the L-block (239) to a free block list (e.g., a free block pool (160) or the free list (275)) such that the L-block (239) may be subsequently allocated to another namespace (or the namespace (221) when needed or requested).

Figure 14:
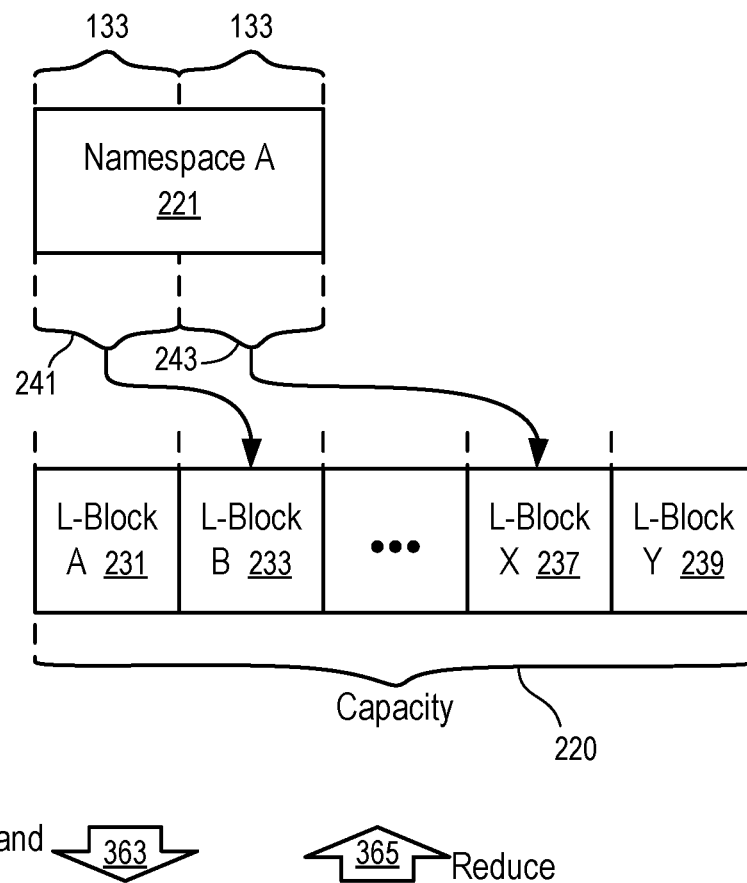
Figure 14:
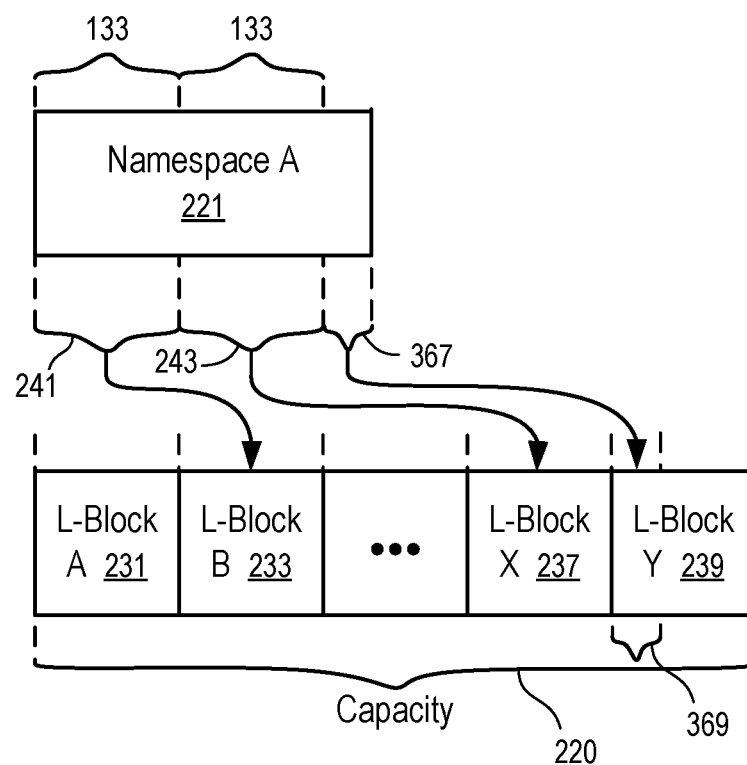

FIG. 14 illustrates an example of expanding a namespace by a partial L-block and/or reducing a namespace by a partial L-block.

For example, a name space (221) having blocks (241, 243) being mapped to L-blocks (233, 237) in FIG. 14 is expanded (363) to have full blocks (241, 243) and a partial block (367) that are mapped to L-blocks (233, 237) and a partial L-block (239) respectively.

To expand the namespace (221) by an added capacity of a partial block (367) smaller than the predetermined block size (133), the namespace map (e.g., 135 or 273) of the namespace (221) is updated to include the identifier of the partial L-block (369) that is allocated from a full block (239), as the expanded capacity of the namespace (221).

For example, to add the capacity of a partial block (367) to the namespace (221), the controller (107) executing the firmware (104) identifies a free partial L-block (369) having the corresponding size (e.g., allocated from a free full block or a free partial block from a free block pool (160) or the free list (275)), and adds the identification (e.g., using an identifier illustrated in FIG. 4) of the partial L-block (239) to the namespace (221) (e.g., as illustrated in FIG. 3).

Preferably, the namespace (221) is mapped to no more than one partial L-block (239). Preferably, the full-size L-blocks (231, 233, ..., 237) of the namespace (221) are contiguous in the capacity (220). A remapping technique (e.g., as discussed in connection with FIG. 17) can be used to optimize the namespace mapping by consolidating partial and full-size L-blocks so that the full-size L-blocks (231, 233, ..., 237) of the namespace (221) are contiguous in the capacity (220) and the namespace (221) has no more than one partial L-block (239).

In a reverse direction, a name space (221) having full blocks (241, 243) and a partial block (367) that are mapped to full L-blocks (233, 237) and a partial L-block (369) can be reduced (365) to have blocks (241, 243) that are mapped to full L-blocks (233, 237) respectively.

To shrink the namespace (221) by removing the capacity of a partial block (367), the namespace map (e.g., 273) of the namespace is updated to remove the partial block identifier (147) of the L-block (369) that corresponds to the removed capacity of the namespace (221). The removed L-block (369) is returned to the free block pool (160) where it can be combined with other free partial block(s) to form a free full L-block (239).

Figure 15:
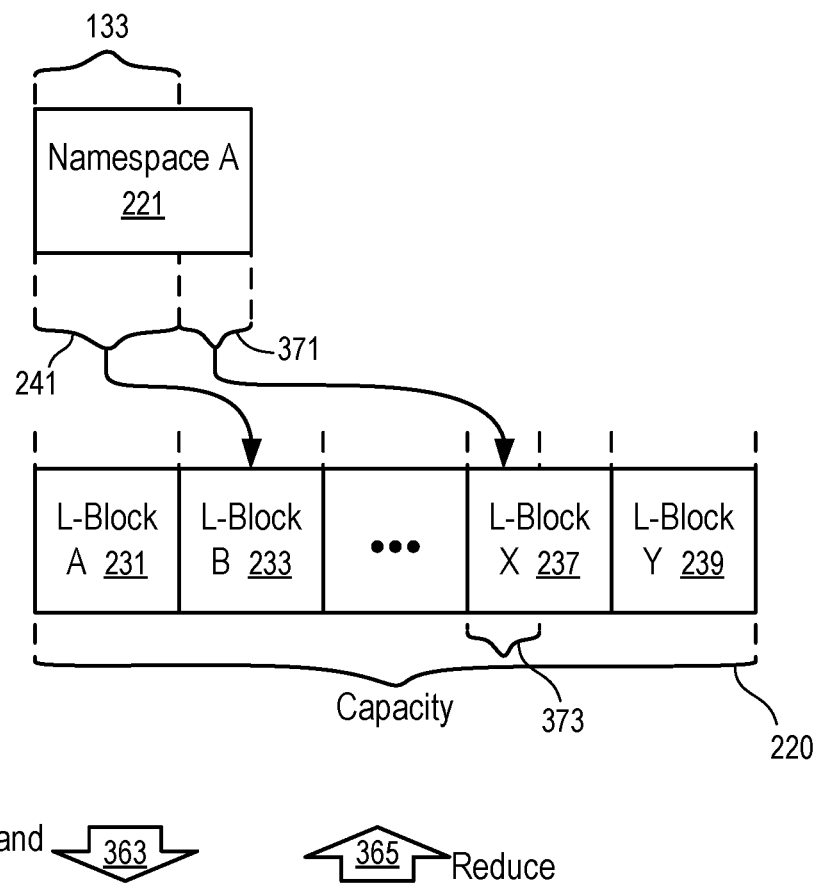
Figure 15:
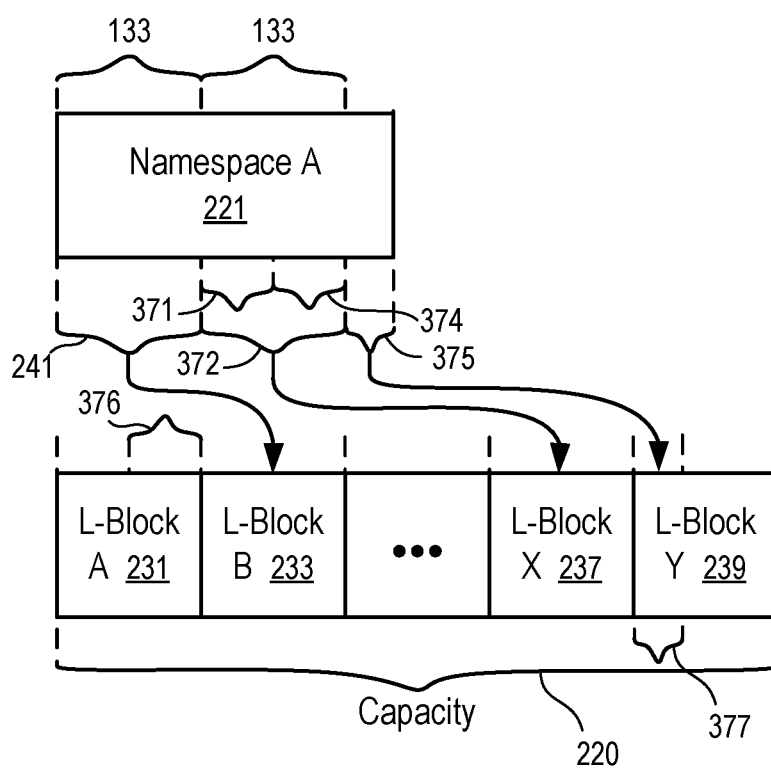

FIG. 15 illustrates an example in which the namespace (221) has a partial block (371/375) before and after the size change.

For example, a namespace (221) having a full block (241) and a partial block (371) that are mapped to a full L-block (233) and a partial L-block (373) in FIG. 15 can be expanded (363) to have full blocks (241, 372), and a partial block (375) that are mapped to full L-blocks (233, 237) and a partial L-block (377) respectively.

In FIG. 15, the L-block (237) from which the partial L-block (373) is allocated has a free capacity that allows the partial L-block (373) to be expanded to the full L-block (237) to accommodate the expanded capacity (372).

Figure 17:
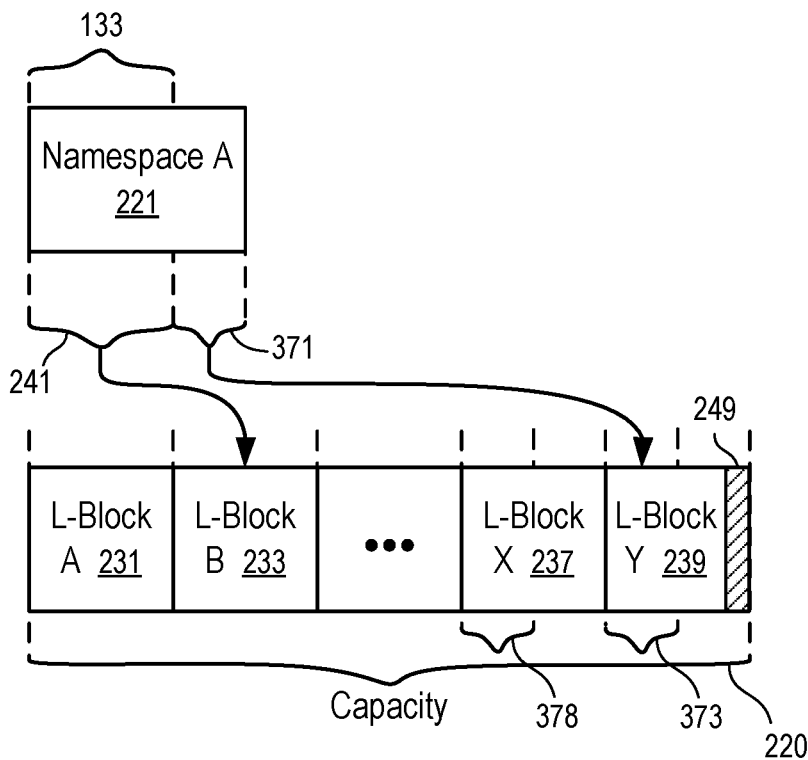
FIG. 17 illustrates remapping of a namespace.
Figure 17:
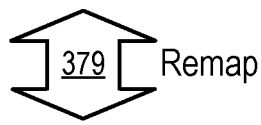
Figure 17:
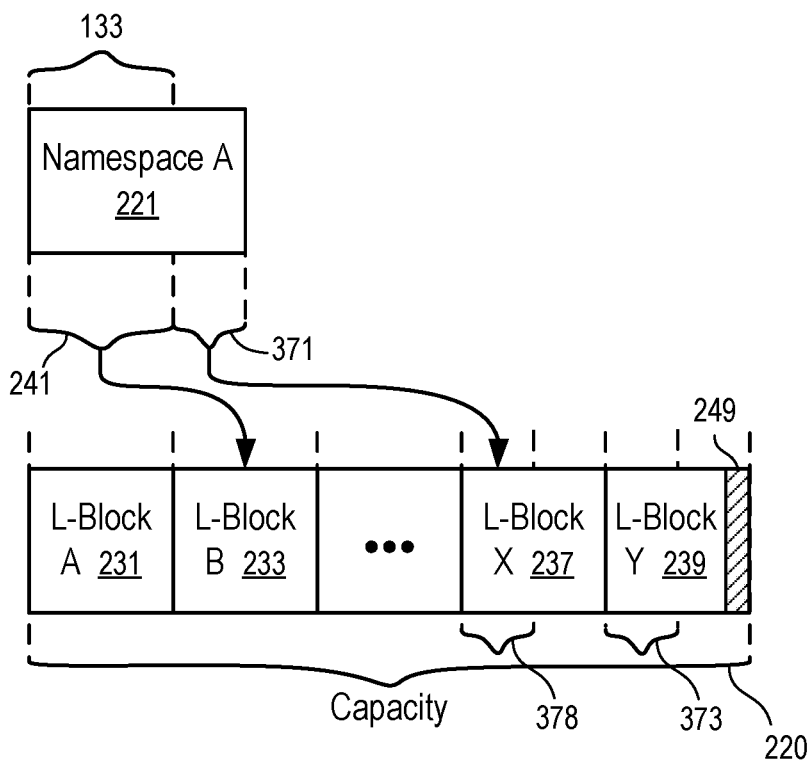

In other instances, when the L-block (237) from which the partial L-block (373) is allocated does not have a free capacity that allows the partial L-block (373) to be expanded to the full L-block (237) (e.g., when another portion of the L-block (237) is currently allocated to another namespace, similar to the situation where the block (239) in FIG. 11 has multiple portions allocated to different namespaces (221 and 223)), the initial partial block (371) can be remapped to another L-block (e.g., 231) (e.g., as illustrated in FIG. 17) to allow its expansion to a full L-block (e.g., 231).

Alternatively, one or more partial L-blocks (e.g., 371, 374) are allocated for the expanded block (372), which can be subsequently combined into a full block via remapping. For example, the portions (371 and 374) of the expanded block (372) can be mapped to partial L-blocks (373 and 376) respectively as an initial response to expand the namespace (221); and subsequently, the mapping to the partial L-blocks (376) can be remapped to the available portion in L-block (237) from which the partial L-block (373) is allocated to form a full L-block (273) that is allocated the namespace (221). Alternatively, the mapping to the partial L-blocks (373) can be remapped to the available portion in L-block (231) from which the partial L-block (376) is allocated to form a full L-block (231) that is allocated to the namespace (221). Alternatively, the partial L-blocks (373 and 376) can be remapped into another full free L-block.

To expand (363) the namespace (221) to include the partial block (375), a partial L-block (377) can be added to the namespace map (e.g., 135 or 273) in a way as illustrated in FIG. 14 for the addition of a partial block (367).

In a reverse direction, a namespace (221) having full blocks (241, 372) and a partial block (375) that are mapped to full L-blocks (233, 237) and a partial L-block (377) can be reduced (365) to have a full block (241) and a partial block (371) that are mapped to a full L-block (233) and a partial L-block (237) respectively, by returning the partial L-block (237) and a portion of the L-block (237) to a free block pool (160) and/or a free list (275) of full L-blocks.

Figure 16:
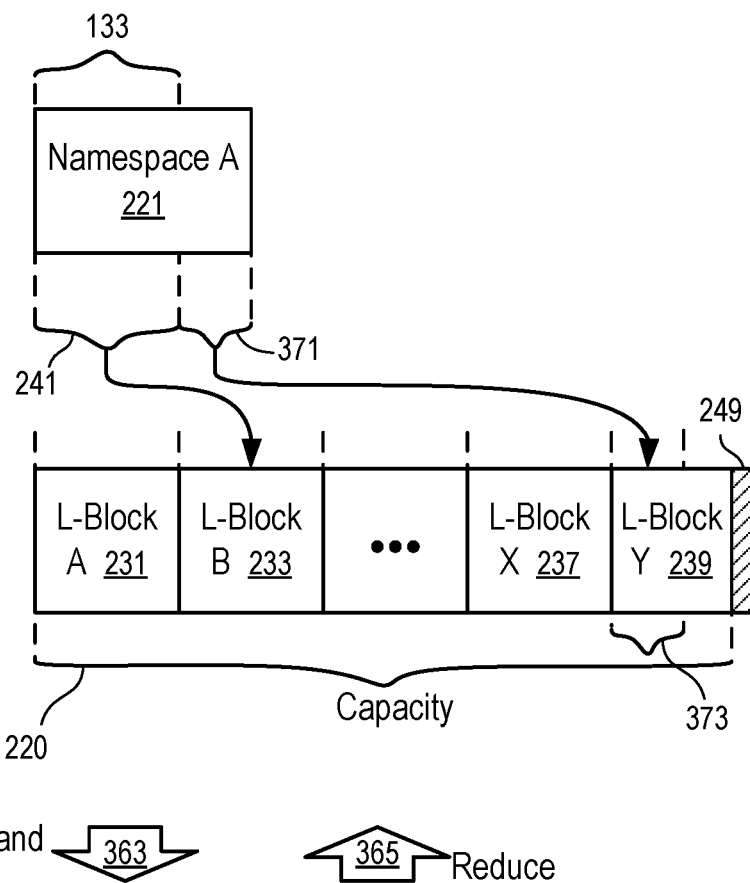
Figure 16:
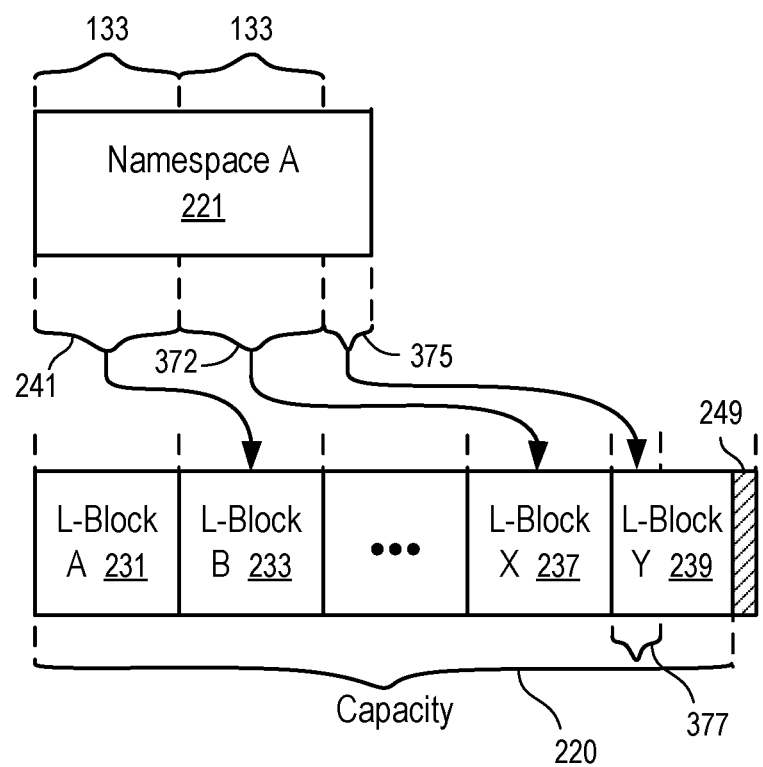

FIG. 16 shows an example of expanding a partial L-block to a full L-block through remapping.

In FIG. 16, a partial block (371) of the namespace (221) is initially mapped to a partial L-block (373) that is allocated from an L-block (239) that does not have sufficient free capacity to be expanded to accommodate a full block of the predetermined block size (133).

When the partial block (371) is expanded (363) into a full block (372), the partial L-block (373) allocated from the L-block (239) cannot be expanded in-place in L-block (239) to a full L-block due to the limitation in the L-block (239). In FIG. 16, the L-block (239) is limited as a result of the capacity (220) being not a multiple of the block size (133). L-block (239) may be considered a partial L-block allocated from a full L-block that contains a portion (249) of virtual capacity that is not actually available in the non-volatile storage media (109). In other instances, the portion (249) may be available in the non-volatile storage media (109), but is currently allocated to another namespace, which prevents the in-place mapping expansion of the partial block (371).

In FIG. 16, when the partial block (371) is expanded (363) into the full block (372), the full block (372) is mapped to another L-block (237) instead of being mapped to the L-block (239) through local expansion. The partial L-block (373) initially allocated to the partial block (371) is freed, from which a partial L-Block (377) is allocated for the added partial block (375) of the namespace (221).

The L-block allocation example of FIG. 16 can be implemented by initially remap the partial block (371) to a partial L-block allocated from the L-block (237) and then expand the namespace (221) in a way as illustrated in FIG. 15. Alternatively, the added capacity of the namespace (221) is initially mapped to partial L-blocks that are subsequently consolidated into the full L-block (237) and the partial L-block (239) via remapping.

In the reverse direction, the namespace (221) can be reduced (365) from having full blocks (241, 372) and a partial block (375), mapped to full L-blocks (233, 237) and a partial L-block (377), to having a full block (241) and a partial block (371) that are mapped to an L-block (233) and a partial L-block (373). The reduction can be implemented via freeing the partial L-block (377), a portion of the L-block (237), and then remapping the remaining portion of the L-block (237) allocated to the block (371) to the partial L-block (373) in the L-block (239) (e.g., remapped to reduce fragmentation of the capacity (220)).

FIG. 17 illustrates remapping of a namespace.

In FIG. 17, the partial block (371) is remapped (379) from a partial L-block (373) allocated from one location in the capacity (220) to another partial L-block (378) allocated from another location in the capacity (220).

To implement the remapping illustrated in FIG. 17, the controller (107) executing the firmware (104) copies the data from the partial L-block (373) to the partial L-block (378), and replaces, in the namespace map (135 or 273) of the namespace (221), the identifier of the partial L-block (373) with the identifier of the partial L-block (378).

FIG. 17 illustrates an example of remapping a partial block (371) to different locations in the capacity (220). The technique can be similarly used to remap (379) full blocks (e.g., 241).

The remapping technique can be used to optimize namespace maps (e.g., 135, 273) such that full L-blocks (231, 233, . . . , 237) allocated for the namespace (221) are in a contiguous section on the capacity, and/or partial L-blocks (369) are combined to reduce the number of free partial L-blocks in the system.

Preferably, remapping is performed in the background to minimize the performance impact in data accessing. As the namespace maps (e.g., 135, 273) are optimized, the computation overhead associated with namespace mapping is reduced; and the data access performance of the storage device (103) is improved.

The techniques discussed above can be used to implement commands, received from the host (101) to change, expand, or shrink the requested namespace size (131) of an existing namespace (221) that has been mapped to the non-volatile storage media (109).

Further, the techniques discussed above can be used to implement thin provisioning of a namespace (221).

Figure 18:
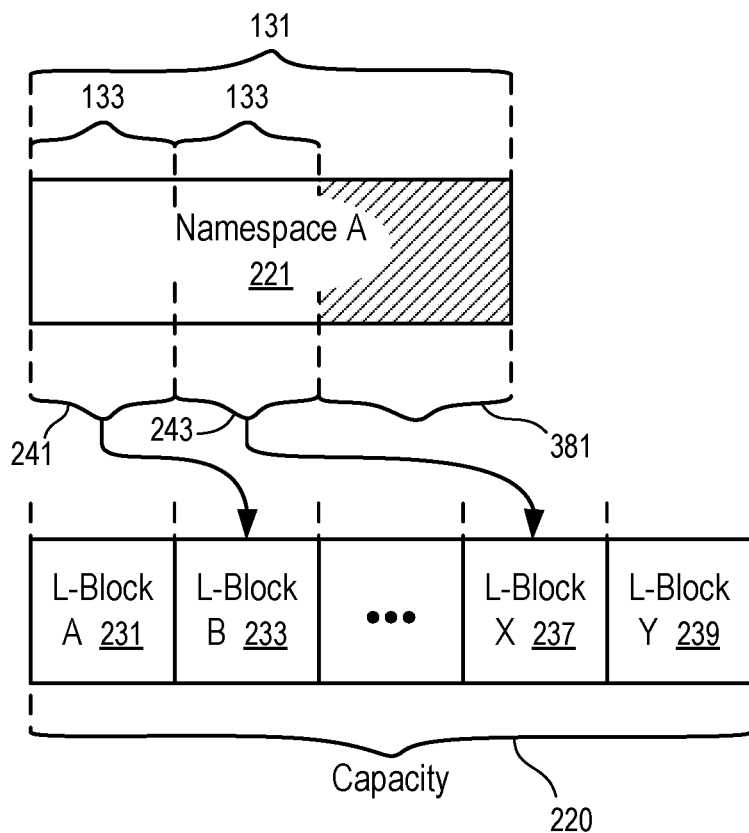
FIGS. 18 and 19 illustrate thin provisioning of a namespace via namespace mapping.
Figure 19:
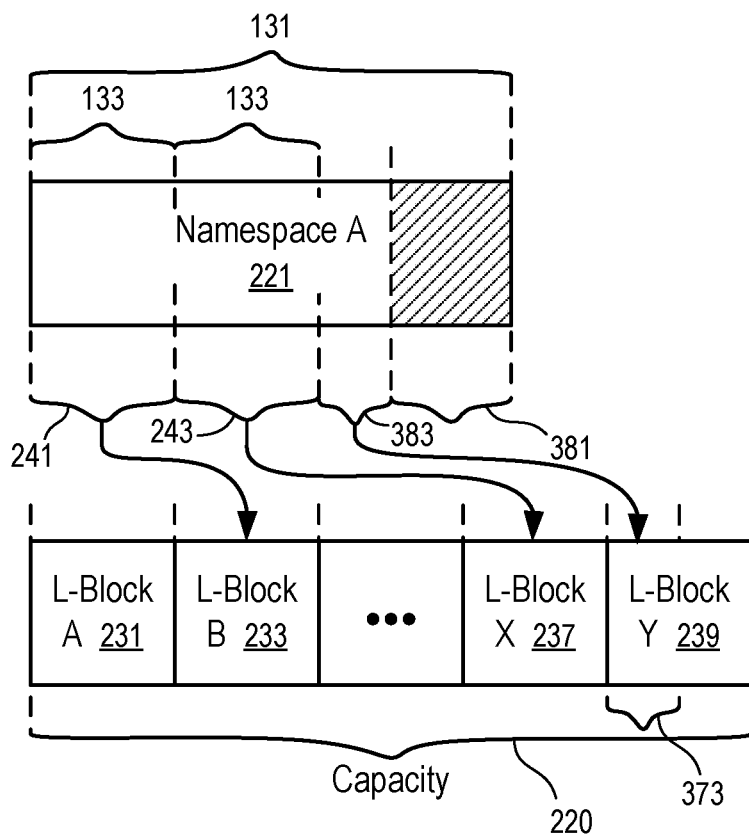

FIGS. 18 and 19 illustrate thin provisioning of a namespace via namespace mapping.

In FIGS. 18 and 19, the namespace (221) is created with a requested namespace size (131). However, only a portion of the namespace (221) (e.g., blocks 241 and 243) is initially allocated for the namespace (221) via its namespace map (e.g., 135, 273). For example, the blocks (241 and 243) are mapped to L-blocks (233 and 237) respectively; and the allocation of the remaining portion (381) of the namespace (221) is postponed until a later stage when additional storage capacity in the remaining portion (381) is needed.

In response to a need to use the remaining portion (381), a further partial block (383) (or a full block) of the namespace (221) is mapped to a partial L-block (373) (or a full L-block). Thus, the remaining unallocated portion (381) of the namespace (221) is reduced.

The incremental provisioning of the allocated portion of the namespace (221) can be managed automatically by the controller (107) with or without explicit requests from the host (101).

Figure 20:
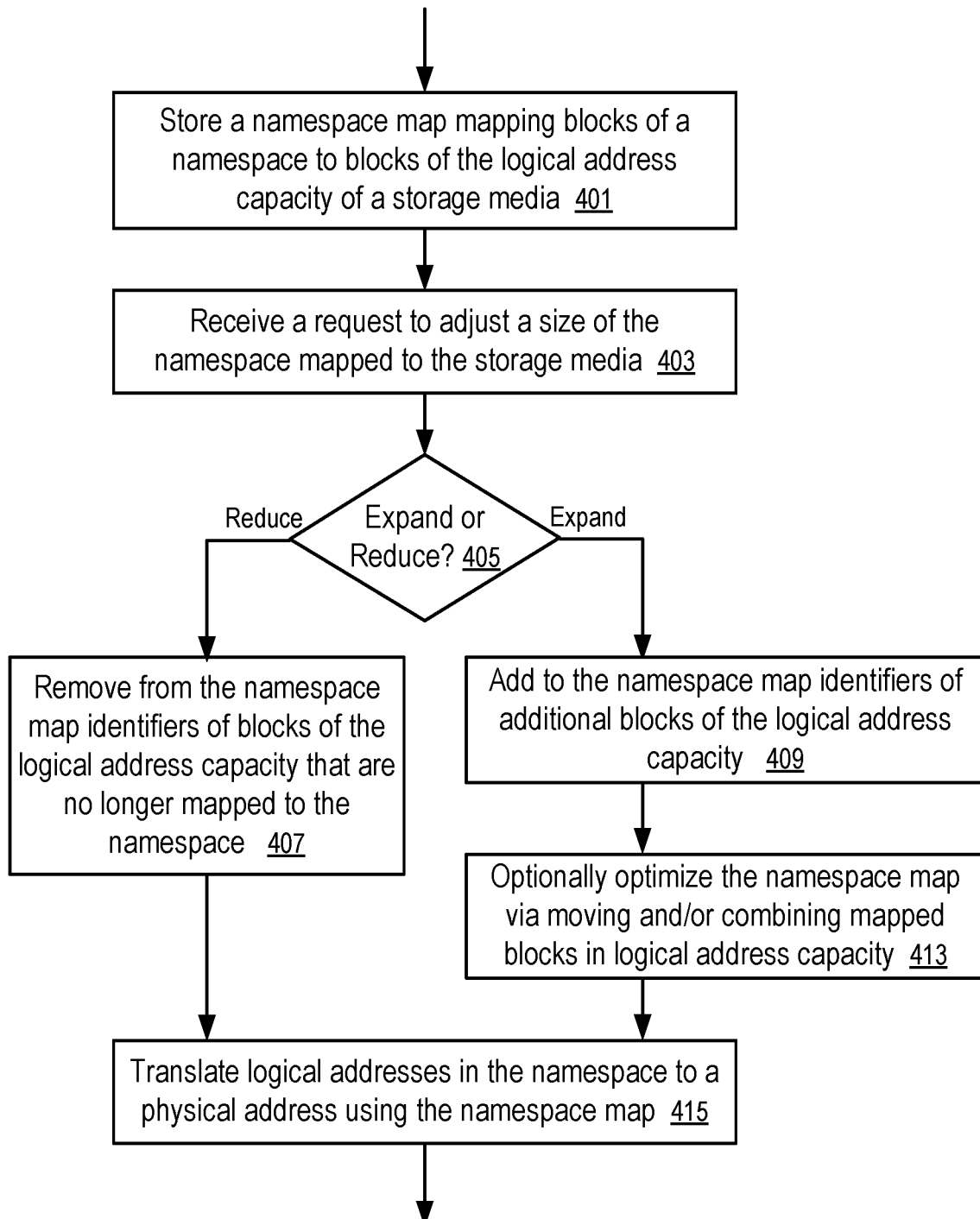
FIG. 20 shows a method to adjust a namespace via adjusting a namespace map.

FIG. 20 shows a method to adjust a namespace (e.g., 221) via adjusting a namespace map.

For example, the method of FIG. 20 can be used to implement the namespace changes illustrated in FIGS.

13-19 in a storage device (103) illustrated in FIG. 1 using data structures illustrated in FIGS. 4 and/or 8-10. For example, the method of FIG. 20 can be programmed via the firmware (104) and executed by the controller (107).

In FIG. 20, the method includes storing (401) a namespace map (e.g., 135 or 273) mapping blocks (e.g., 241, 383) of a namespace (221) to blocks (e.g., 233, 373) of the logical address capacity (220) of a non-volatile storage media (109). The namespace map (e.g., 135 or 273) can be created in response to allocating the namespace (221) (e.g., in a way as illustrated in FIG. 3, 7, or 11).

After receiving (403) a request to adjust a size of the existing namespace (221) mapped to the non-volatile storage media (109), the method determines (405) whether the request is to expand or reduce the allocation of the namespace (221) on the non-volatile storage media (109).

In response to a determination (405) to reduce the allocation of the namespace (221) on the non-volatile storage media (109), the method further includes removing (407) from the namespace map (e.g., 241, 383) identifiers of blocks of the logical address capacity that are no longer mapped/allocated to the namespace (221).

In response to a determination (405) to expand the allocation of the namespace (221) on the non-volatile storage media (109), the method further includes adding (409) to the namespace map (e.g., 241, 383) identifiers of additional blocks of the logical address capacity.

For example, as illustrated in FIG. 13, the identifier of a full L-block (239) is added to the namespace map (e.g., 241, 383) of the namespace (221) to expand the namespace (221) by the full block (361).

For example, as illustrated in FIG. 14, the identifier of a partial L-block (369) is added to the namespace map (e.g., 241, 383) of the namespace (221) to expand the namespace (221) by a partial block (367).

In some instances (e.g., as illustrated in FIG. 15), the identifier of a full L-block (e.g., 237) is added to replace the identifier of a partial L-block (e.g., 373) that is expanded to the full L-block (e.g., 237) in allocation.

Optionally, the method further includes optimizing (413) the namespace map (e.g., 241, 383) via moving and/or combining mapped blocks in logical address capacity (220). For example, the mapping of the partial block (371) on the capacity (220) may be moved from the partial L-block (373) to the partial L-block (378) illustrated in FIG. 17 to prepare the expansion of the partial block (371) to a full block, or to combine with a partial block allocated from the L-block (237) to accommodate the expansion of the partial block (371). For example, the mapping to the full L-blocks on the capacity (220) can be moved around to consolidate the full L-blocks allocated to the namespace (221) in a contiguous segment.

The method of FIG. 20 includes translating (415) logical addresses defined in the namespace (221) to mapped logical addresses (257) defined on the entire capacity (220) of the storage device (103) and then to physical addresses (259) using the namespace map (e.g., 241, 383).

For example, a logical address in a block (e.g., 241, 371) of the namespace can be linearly mapped to the corresponding address (257) in the L-block (e.g., 233, 378) of the capacity (220), which can then be further mapped to a physical address (e.g., 259) (e.g., by a Flash Translation Layer (FTL) of a solid state drive (SSDs)) in a way independent of namespaces.

For example, the computer storage device (103) illustrated in FIG. 1 has a host interface (105), a controller (107), non-volatile storage media (109), and firmware (104). The firmware (104) instructs the controller (107) to: store a namespace map (e.g., 135, 273) that maps blocks of logical addresses defined in a namespace (111 or 221) to blocks of a logical address capacity (220) of the non-volatile storage media (109); adjusts the namespace map (e.g., 135, 273) to change a size of the namespace (111 or 221); and translates logical addresses defined in the namespace (111 or 221) to physical addresses (259) for the non-volatile storage media (109) using the namespace map (e.g., 135, 273) that first maps the logical addresses defined in the namespace (111 or 221) to the logical addresses in the logical address capacity (220) of the non-volatile storage media (109).

The namespace map (e.g., 135, 273) can be adjusted in response to a request for a host (101) to increase (363) the size of the namespace (111 or 221), where the adjustment can be performed via adding an identifier of a block of the logical address capacity (220) for association with the namespace (111 or 221).

The namespace map (e.g., 135, 273) can be adjusted in response to a request for a host (101) to reduce (365) the size of the namespace (111 or 221), where the adjustment can be performed via removing an identifier of a block of the logical address capacity (220) from association with the namespace (111 or 221).

In implementing thin provisioning, the namespace map (e.g., 135, 273) can be adjusted in response to an increase in demand of allocated capacity of the namespace (111 or 221) with or without an explicit request from the host (101).

Preferably, the logical address capacity (220) of the non-volatile storage media (109) is divided into predetermined blocks having a same, predetermined block size (133) that is a power of two.

In one scenario, before the size of the namespace (111 or 221) is changed, the namespace (111 or 221) has a partial block (371) having a size smaller than the predetermined block size (133), and the partial block (371) is mapped by the namespace map (e.g., 135, 273) to a portion (373) of a first particular block (239) of the predetermined blocks. After the size of the namespace (111 or 221) is changed, the size of the partial block (371) is increased, and the expanded first block (372) is mapped by the namespace map (e.g., 135, 273) to at least a portion of a second particular block (237 or 239) of the predetermined blocks, as illustrated in FIGS. 15 and 16.

The second particular block can be different from the first particular block, as illustrated in FIG. 16.

To implement a scenario as illustrated in FIG. 16, the namespace map (e.g., 135, 273) can be adjusted via: copying data from the portion (373) of the first particular block (239) to a corresponding portion (378) of the second particular block (237) (e.g., as illustrated in FIG. 17); and replacing in the namespace map (e.g., 135, 273) an identifier of the portion (373) of the first particular block (239) with an identifier of the corresponding portion (378) of the second particular block (237). The allocation of the corresponding portion (378) of the second particular block (237) can then be expanded on the second particular block (237) to accommodate the expansion.

In an alternative way to implement a scenario as illustrated in FIG. 16, the namespace map (e.g., 135, 273) can be adjusted via: dividing the at least portion of the second particular block (237) into a first portion and a second portion, where the second portion (378) is reserved to receive a copy of the content from the portion (373) of the first particular block (239); and adding to the namespace map (e.g., 135, 273) an identifier of the first portion of the second particular block (237). After the size of the namespace (111 or 221) has changed, a background process is used to copy data from the portion (373) of the first particular block (239) to the second portion (378) of the second particular block (237). Subsequently, the controller (107) replaces in the namespace map (e.g., 135, 273) an identifier of the portion (373) of the first particular block (239) and the identifier of the first portion of the second particular block (237) with an identifier of the at least a portion of the second particular block (237).

After the size of the namespace (221) is changed, the size of the first block (371) can be increased to the predetermined block size (133); and a partial block identifier can be replaced with a full block identifier.

Copies of a namespace map (135 or 273) can be used by different processors of the controller (107) and stored at different memory locations in a computer storage device (103) for improved data access performance. After a change is made to the namespace map (135 or 273), the storage device (103) is configured to propagate the change to the corresponding memory locations in a way that avoids undesirable and/or inconsistent data access, as further discussed below.

Figure 21:
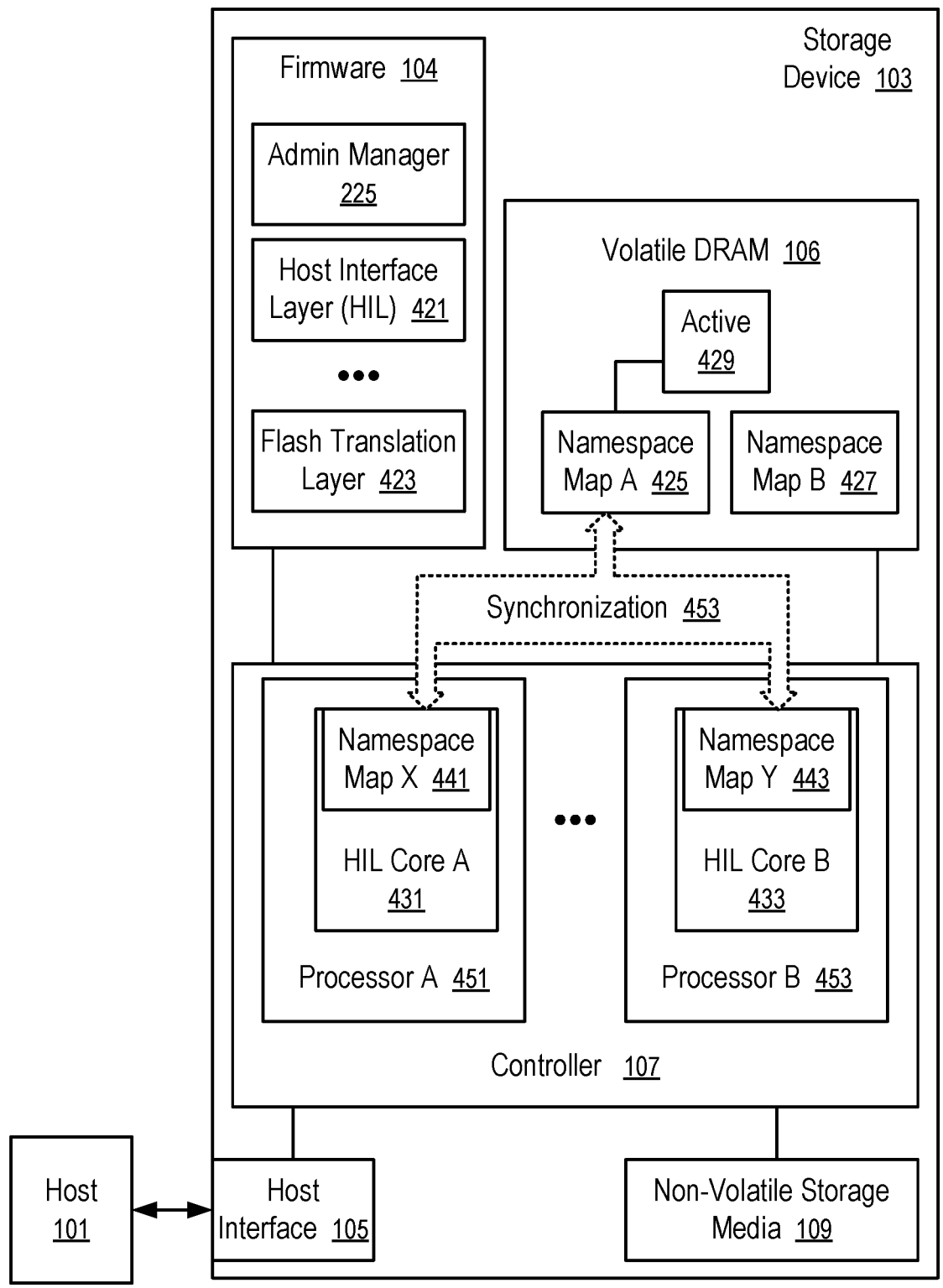
FIGS. 21 and 22 show the propagation of name changes in a computer storage device.

FIG. 21 shows the propagation of namespace changes in a computer storage device (103) based on the change of an identification of an active copy of a namespace map (135 or 273).

The firmware (104) illustrated in FIG. 21 includes a number of components, such as an administrative manager (225), a host interface layer (HIL) (421), and a flash translation layer (423).

The administrative manager (225) generates and changes a namespace (e.g., 111, 221, 223) in response to a namespace command (e.g., 261, 263, 265) received via the host interface (105) from the host (101).

The host interface layer (HIL) (421) includes a data manager (or I/O manager) (227) that uses a namespace map (e.g., 135 or 273) to convert a logical address specified in a particular namespace (e.g., 111, 221, 223) to a mapped logical address (257) in the capacity (220) of the storage device (103).

The flash translation layer (423) further translates the mapped logical address (257) in the capacity (220) of the storage device (103) to a physical address (259) in the non-volatile storage media (109) to access a memory unit corresponding to the mapped logical address (257) in the capacity (220) of the storage device (103).

In combination, the host interface layer (HIL) (421) and the flash translation layer (423) translate the logical address specified in the particular namespace (e.g., 111, 221, 223) into the physical address (259) for addressing the memory unit in the non-volatile storage media (109).

Running instances of components (225, 421, 423) of the firmware (104) are executed in processors (451, 453) of the controller (107) to store data in, or retrieve data from, the non-volatile storage media (109), in connection with communication through a host interface (105) with the host (101) (e.g. in ways similar to those discussed above in connection with FIG. 1).

The firmware (104) can be initially stored in the non-volatile storage media (109) and loaded into the volatile DRAM (106) and/or the cache memory of the processors (451, 453) of the controller (107) for execution.

A running instance of the administrative manager (225) maintains a copy (425) of the namespace map (e.g., 135 or 273), which copy (425) is identified as active by the indicator (429).

The active copy (425) can be cached and used by the host interface layer (HIL) (421) in data access, such as storing data in and/or retrieving data from the non-volatile storage media (109) using logical addresses defined in a namespace (e.g., 111, 221, 223) as specified in data access commands from the host (101).

Preferably, the active copy (425) always has a backup copy in the non-volatile storage media (e.g., 109) of the storage device (103). In some instances, the active copy (425) and the active indicator (429) are maintained in the non-volatile storage media (109) without being stored in the volatile DRAM (106), where the storage device (103) may or may not have volatile DRAM (106).

When the active indicator (429) identifies the copy (425) as being active, synchronization (453) of cached copies (e.g., 441, 443) of the namespace map (e.g., 135 or 273) in running instances of components of the firmware (104) is performed to cache the content of the copy (425) that is identified by the active indicator (429).

The controller (107) of the computer storage device (103) illustrated in FIG. 21 has multiple processors (451, 453). Each of the processors (451, 453) is capable of running an instance of a host interface layer (HIL) (421) independent of the operation of other processors (451, 453).

In FIG. 21, a running instance of the host interface layer (HIL) (421), including active data of the running instance, is illustrated as a HIL core (e.g., 431, 433).

Preferably, each HIL core (431, 433) of the host interface layer (HIL) (421) caches its own copy (441, 443) of the namespace map (135 or 273) such that different HIL cores (431, 433) of the host interface layer (HIL) (421) can separately use their respective cached copies (441, 443) of the namespace map (135 or 273) for concurrent execution in different processors (e.g., 451 and 453).

Alternatively, a shared copy of the namespace map (135 or 273) can be stored in a common memory shared by multiple processors (e.g., 451, 453); however, such an arrangement may cause performance degradation when there is a collision in accessing the shared memory, such as when different HIL cores (431, 433) of the host interface layer (HIL) (421) attempt to access the shared memory at the same time.

Preferably, each HIL core (e.g., 431, 433) has its locally cached copy (e.g., 441, 443) of the namespace map (135 or 273) for a respective processor (451 or 453). For example, a cached copy (e.g., 441, 443) of the namespace map (135 or 273) in a HIL core (e.g., 431, 433) can be in the cache memory of a processor (e.g., 451, 453) for improved performance in logical address translation during data access.

Optionally or alternatively, a copy (e.g., 441, 443) of the namespace map (135 or 273) in a HIL core (e.g., 431, 433) can be cached in a section of the volatile DRAM (106), where different copies in different sections of the volatile DRAM (106) can be simultaneously accessed independently from each other to allow concurrent/parallel execution by the HIL cores (e.g., 431, 433).

When the volatile DRAM (106) is not configured in an embodiment of the storage device (103) (e.g., when the non-volatile storage media (109) is implemented using cross point storage and memory devices and thus, having data access performance similar to volatile DRAM (106)), the different copies (431, 433) of the namespace map (135 or 273) can be cached in different sections of the non-volatile storage media (109), where the different sections can be simultaneously accessed independently from each other to allow concurrent/parallel execution by the HIL cores (e.g., 431, 433).

Thus, in general, the cached copies (441, 443) of the namespace maps of the HIL cores (431, 433), the active copy (425) and the active indicator (429) are not limited to be stored in specific locations as illustrated in FIG. 21. They can be stored in one or more of: cache memory of the processors (451, 453), different sections of the volatile DRAM (106), different sections of the non-volatile storage media (109), and/or other memory sections of the storage device (103).

Preferably, the host interface layer (HIL) (421) uses the namespace map (135 or 273) in local block address mapping, but does not make changes to the namespace map (135 or 273). Changes to the namespace map (135 or 273) are made via a running instance of the administrative manager (225).

Preferably, no more than one running instance of the administrative manager (225) (and/or the firmware (104)) is implemented in the storage device (103) to change the namespace map (135 or 273).

Alternatively, when multiple running instances of the administrative manager (225) (and/or other components of the firmware (104)) are implemented in the storage device (103) to change the namespace map (135 or 273), different running instances of the administrative manager (225) communicate with each other (e.g., using a cache coherence protocol) to synchronize changes made to the namespace map (135 or 273).

Preferably, only the administrative manager (225) is allowed to make changes to the namespace maps (e.g., 135, 273) and the identifications of free L-blocks, full or partial, in response to namespace management commands (e.g., 261, 263, 265) from the host (101) and/or a background process to optimize the namespace maps (e.g., 135, 273).

For example, in response to a command from the host (101) to create (261), delete (263), or change (265) a namespace (e.g., expand (363) or reduce (365) the size of a namespace), the administrative manager (225) generates or adjusts the namespace map (e.g., 135, 273) in ways discussed above in connection with FIGS. 1-20.

In general, the operations of the administrative manager (225) has limited impact on the performance of the storage device (103) in servicing data access needs of the host (101) using the non-volatile storage media (109). Thus, the running instance of the administrative manager (225) may maintain the active copy (425) of the namespace map (e.g., 135, 273) in the volatile DRAM (106) (or the non-volatile storage media (109)), instead of in the cache memory of a processor (e.g., 451 or 453).

The active copy (425) of the namespace map (e.g., 135, 273) can be copied into the HIL cores (431, 433) for data access operations (e.g., store data into or retrieve data from the non-volatile storage media (109)).

In some instances, one of the local copies (441, 443) of the namespace maps cached for a processor (e.g., 451, or 453) is identified as the active copy (425).

When the active copy (429) is maintained in the volatile DRAM (106) or the cache memory of a processor (e.g., 451, 453), a backup copy is stored in a non-volatile storage media (e.g., 109) of the storage device (103) to prevent data lost in the event of unexpected power interruption.

Preferably, in response to a namespace management command (e.g., 261, 263, 265) from the host (101) that can cause a change in the namespace map (e.g., 135, 273), the administrative manager (225) makes a shadow copy (427) from the active copy (425) and implements changes in the shadow copy (427) during the execution of the namespace management command (e.g., 261, 263, 265).

During the time period in which the administrative manager (225) changes the shadow copy (427), the HIL cores (451, 453) use the active copy (425) for synchronization (453). Thus, the HIL cores (451, 453) have a coherent view of the namespaces (111, 221, 223) on the non-volatile storage media (109).

Figure 22:
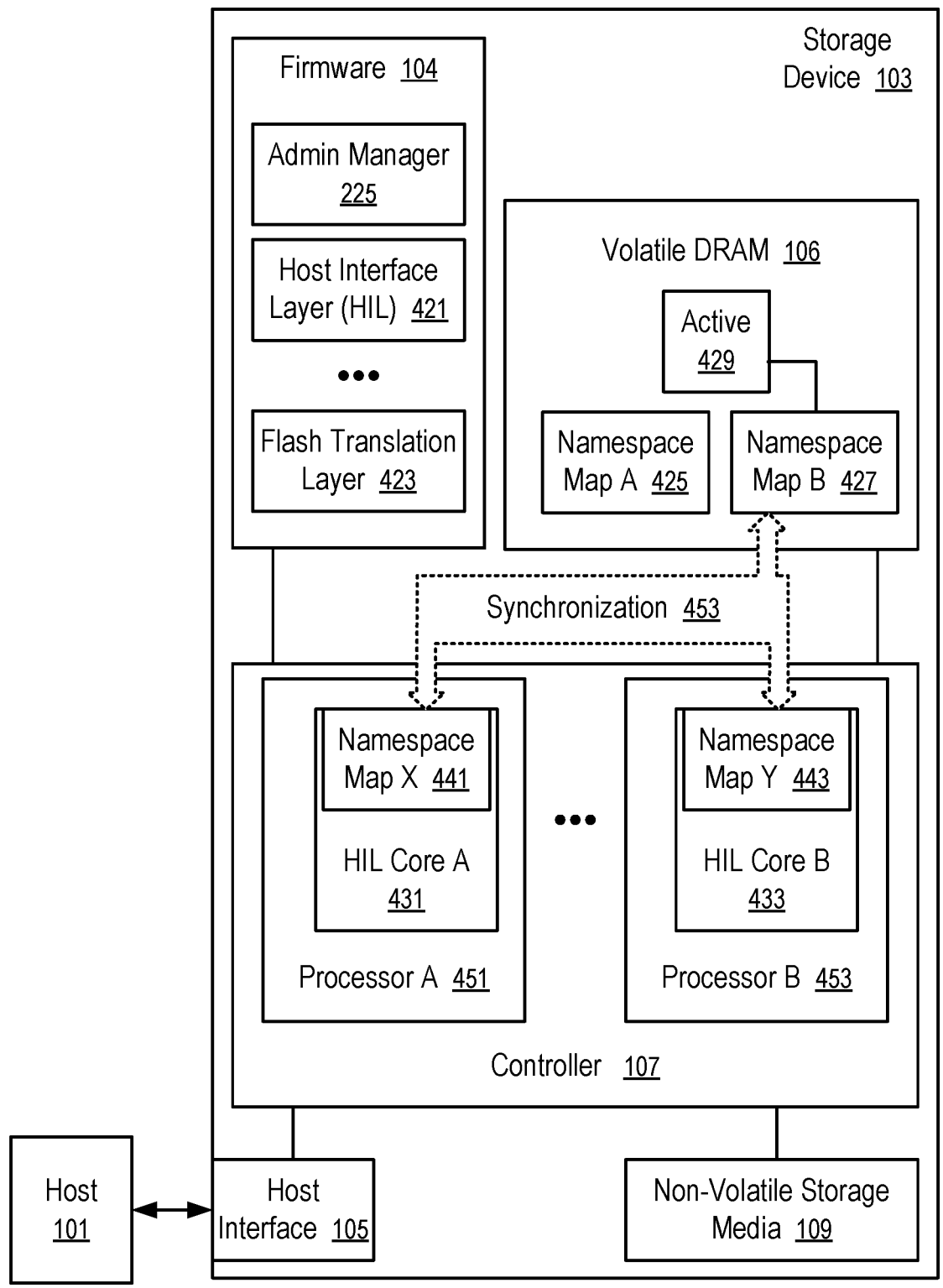

After the changes to the shadow copy (427) are complete as a result of the execution of the namespace management command (e.g., 261, 263, 265), the administrative manager (225) changes the active indicator (429) to make the shadow copy (427) active, as illustrated in FIG. 22.

When the shadow copy (427) is created in a volatile memory (e.g., volatile DRAM (106) or cache memory of a processor (e.g., 451, 453), it is preferred that the shadow copy (427) is backed up in the non-volatile storage media (e.g., 109) of the storage device (103) before it is made active. In some instances, the shadow copy (427) is created and changed directly on the non-volatile storage media (e.g., 109) of the storage device (103) before it is made active and/or loaded into the volatile DRAM (106) as an active copy.

The change in the active indicator (429) causes a change in the synchronization (453) operation. Once the copy (427) is marked by the active indicator (429) as being active in FIG. 22, the HIL cores (451, 453) perform synchronization (453) with the copy (427) in FIG. 22. In contrast, during the time period in which the copy (425) is marked by the active indicator (429) as being active in FIG. 21, the HIL cores (451, 453) perform synchronization (453) with the copy (425) in FIG. 21.

A register or a memory unit in the volatile DRAM (106) in the storage device (103) can be used to identify the location of an active copy (e.g., 425) of the namespace map (e.g., 135, 273), such that when the namespace map (e.g., 135, 273) is needed for a HIL core (e.g., 451, 453), the controller (107) loads into the HIL core (e.g., 451, 453) the active copy (e.g., 425) of the namespace map (e.g., 135, 273) from a location identified by the register or memory unit.

In some instances, when the content of the register or the memory unit is changed to indicate the availability of a new namespace map (e.g., 135, 273), the HIL cores (e.g., 451, 453) are required to update their local cached copies (441, 443) of namespace maps according to the active copy (e.g., 425) before performing further address conversion.

In general, when more than one running instance of one or more components (e.g., 225 and 421) of the firmware (104) is allowed to make changes to the namespace map (e.g., 135, 273) (and the identifications of free partial/full L-blocks), the storage device (103) is configured to manage cache coherence among the running instances using a coherence protocol, such that the content of the namespace map (e.g., 135, 273) used in different running instances is independent of the timing of caching operations.

For example, a write invalidate protocol can be used to maintain cache coherence where a change made in the L-block mapping for a namespace (e.g., 111 or 221) in one running instance causes the other running instances to invalidate their copies of mapping data and thus force reading of the updated mapping data for the namespace (e.g., 111 or 221) when the mapping data is needed (e.g., reading from the active copy (425) in FIG. 21; the active copy (427) in FIG. 22; or from the running instance that makes the change).

For example, a write update protocol can be used to maintain cache coherence where a change made in the L-block mapping for a namespace (e.g., 111 or 221) in one running instance causes the other running instances to update their copies of mapping data accordingly.

The coherence protocol can be simplified by allowing no more than a single running instance of the administrative manager (225) to make changes to the L-block mapping of a namespace (e.g., 111 or 221). Multiple running instances of the host interface layer (HIL) (421) (e.g., HIL cores (431, 433)) use the L-block mapping of the namespace (e.g., 111 or 221), but do not make any changes to the L-block mapping.

In one implementation, when the administrative manager (225) starts an operation to change the L-block mapping for a namespace (e.g., 111 or 221), the administrative manager (225) makes a shadow copy (427) of the active copy (425) of namespace data for namespaces currently configured in the storage device (103) (e.g., 111, 221, 223) and implements changes in the shadow copy (427). Upon completion of the changes, the administrative manager (225) changes the active indicator (429) to make the shadow copy (427) active and simultaneously deactivates the previously active copy (425). Changing the active indicator (429) (e.g., from pointing to one copy (425) to another (427)) causes the storage device (103) to invalidate the cached copies (441, 443) of the HIL cores (431, 433) and/or update the cached copies (441, 443) of the HIL cores (431, 433).

During the time period in which the administrative manager (225) is working on the shadow copy (427), the HIL cores (431, 433) maintain cache coherence based on the active copy (425), as if no changes had been made to the L-block mapping data. For example, if the HIL core (431) has a valid cached copy (441) that was previously loaded from the active copy (425), the HIL core (431) continues using the cached copy (441) in translating logical addresses from namespaces (e.g., 111 or 221) to the capacity (220). For example, if the HIL core (431) needs a cached copy (441) (e.g., during its startup operation, or the previously cached version was previously invalidated), the HIL core (431) obtains the cached copy (441) from the active copy (425) and then uses the cached copy (441) in translating logical addresses from being defined in namespaces (e.g., 111 or 221) to being defined in the capacity (225). Such an implementation causes minimum impact on data access while the namespace mapping data is being changed.

However, in some instances, data access made using the active copy (425) may not be desirable in view of the pending changes in the shadow copy. Thus, the administrative manager (225) is configured to notify the HIL cores (431, 433) to pause (stop temporarily) or delay data access in namespaces (e.g., 111 or 221) that are impacted by the changes, while allowing the HIL cores (431, 433) to continue accessing data according to the active copy (425) (e.g., as respective cached copies (441, 443) for data access in other namespaces. The request to pause or delay data access in the impacted namespaces (e.g., 111 or 221) can be discarded after a change in the active indicator (429). The change in the active indicator (429) cause the HIL cores (431, 433) to update their cached copies (441, 443) according to the currently active copy (425 in FIG. 21; 427 in FIG. 22) identified by the active indicator (429).

Preferably, the administrative manager (225) provides a notification to the HIL cores (431, 433) to pause data access of selected namespaces (e.g., 111 or 221) and thus allow the HIL cores (431, 433) to continue to access remaining namespaces. Alternatively, the administrative manager (225) provides a notification to the HIL cores (431, 433) to pause data access to all of the namespaces on the non-volatile storage media (109).

For example, the namespace info (271) illustrated in FIG. 4 can be modified to provide each namespace (e.g., 281) with a pause indicator, in addition to the contiguous indicator (e.g., 292). When the pause indicator is set to a predefined value for the namespace (e.g., 281), access to the namespace (e.g., 281) is paused or delayed until a change in the active indicator (429), which causes the removal of the predefined value from the pause indicator.

In some instances, the storage device (103) can separately pause, or stop temporarily, data retrieval operations and data storing operations. For example, a data access policy may be established to pause data storing operations without pausing data retrieval operations, or to pause data retrieval operations without pausing data storing operation. The data access policies can be separately configured for individual namespaces (e.g., 281), or for the storage device (103) as a whole.

In some instances, the administrative manager (225) automatically identifies the namespaces that need to be paused or delayed, based on the type of changes to be applied on the shadow copy (427 in FIG. 21, 425 in FIG. 22) and/or the data access policies.

For example, when a namespace change command (265) is issued on a namespace (221), the administrative manager (225) may pause the data access to the namespace (221), such that data cannot be retrieved from and/or stored into the memory units that are freed from the namespace (221).

For example, when a namespace change command (265) is issued on a namespace (221), the administrative manager (225) may pause the data access to the namespace (221) to prevent errors in retrieving data from and/or storing data into the memory units that are being added to the namespace (221).

In some instances, the host (101) is responsible for sending commands to pause data access in selected namespace (221) in preventing data from being retrieved from and/or stored into the memory units that are freed from the namespace (221), and/or preventing errors in retrieving data from and/or storing data into the memory units that are added to the namespace (221).

In some instances, data is allowed to be retrieved from and/or stored into the memory units that are freed from the namespace (221).

In some instances, errors in retrieving data from and/or storing data into the memory units that are added to the namespace (221) are handled by the host (101).

Optionally, the storage device (103) has one or more configuration parameters based on which the administrative manager (225) determines whether or not to pause data access (read and/or write) in a namespace (221) when the L-block mapping of the namespace (221) is being changed in the shadow copy (427 in FIG. 21).

Figure 23:
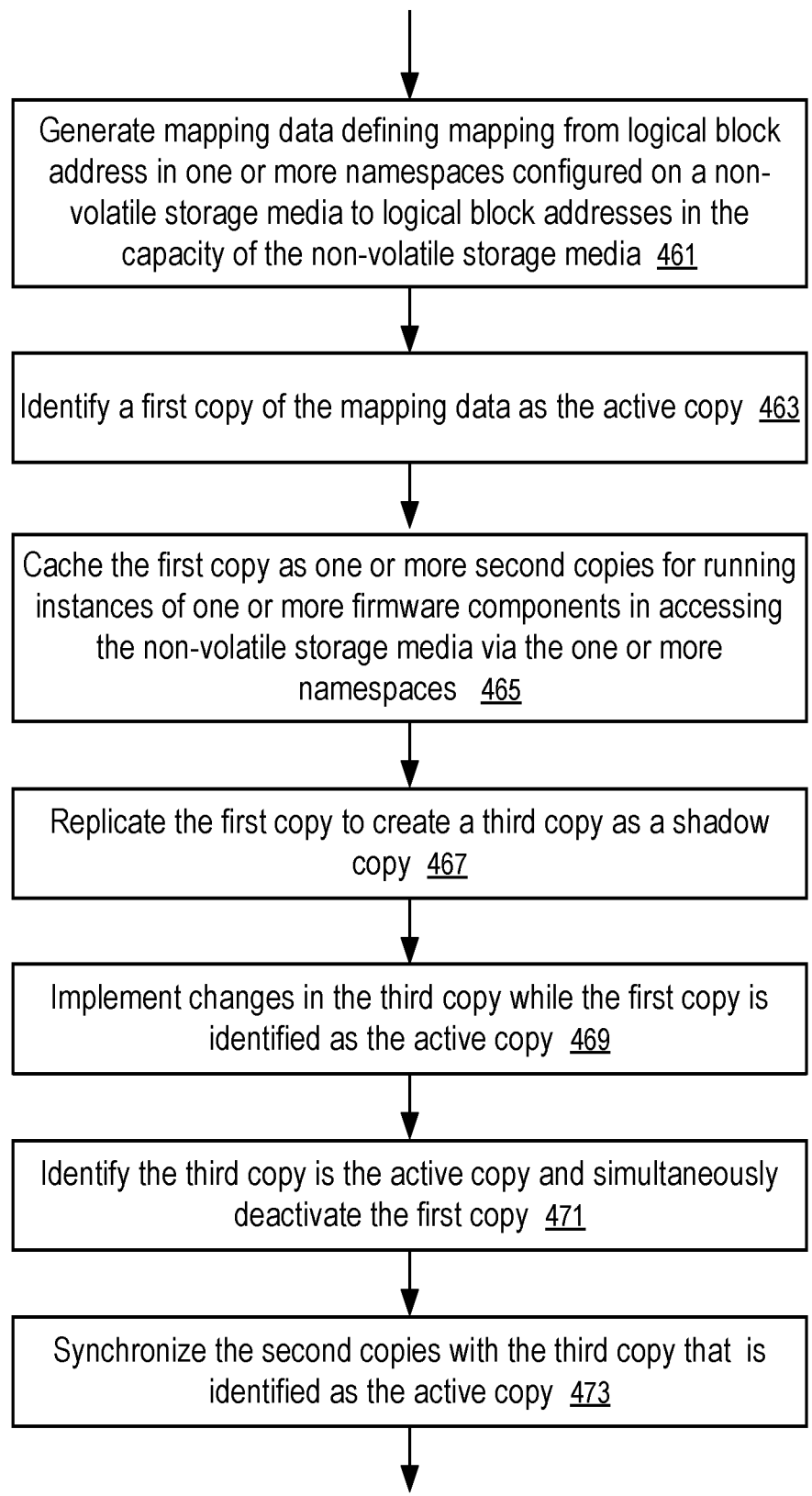
FIG. 23 shows a method to implement changes in namespaces in a computer storage device having multiple copies of namespace data.

FIG. 23 shows a method to implement changes in namespaces (e.g., 111, 221, 223) in a computer storage device (103) having multiple copies of namespace data.

For example, the method of FIG. 23 can be implemented in the storage device (103) illustrated in FIG. 1, or FIGS. 21 and 22.

The method includes generating (461) mapping data defining mapping from the logical address in one or more namespaces (e.g., 111, 221, 223) configured on a non-volatile storage media (109) to mapped logical addresses (257) in the capacity (220) of the non-volatile storage media (109), as illustrated in any of FIGS. 7, 8, 2-4, 11, and 13-19.

After identifying (463) the first/active copy (425) of the mapping data as the active copy, the method includes caching (465) the first/active copy (425) as one or more second/cached copies (441, 443) for running instances (431, 433) of one or more firmware components (e.g., 421) in accessing the non-volatile storage media (109) via the one or more namespaces (e.g., 111, 221, 223) configured on the non-volatile storage media (109).

In response to a need to make changes to namespaces (e.g., 111, 221, 223) configured on a non-volatile storage media (109), the method replicates (467) the first/active copy (425) to create a third copy as a shadow copy (427) and implements (469) changes in the third/shadow copy (427) while the first/active (425) copy is identified as the active copy (425) in the storage device (103).

Upon completion of the changes made in the third/shadow copy (427), the method identifies (471) the third/shadow copy (427) as the active copy and simultaneously deactivates the first/active copy (425), as illustrated in FIG. 22.

Once the third/shadow copy (427) is activated, the method synchronizes (473) the second/cached copies (453) with the third/shadow copy (427) that is identified as the active copy in the storage device (103).

The method can be implemented as firmware (104) executed in the controller (107) of the storage device (103) that has the non-volatile storage media (109).

As illustrated in FIGS. 22 and 23, the controller may have a plurality of processors (451, 453) that execute the one or more running instances of the HIL cores (431, 433) of a first component (e.g., 421) of the firmware (104) in parallel. The second/cached copies (441, 443) for the running instances of the HIL cores (431, 433) can be cached in separate memory areas to support concurrent processing by the plurality of processors (451, 453), such as in the cache memory of different processors (451, 453), in different sections of dynamic random access memory (106) that can be accessed in parallel by the plurality of processors (451, 453), and/or in different sections of non-volatile storage media (109) that can be accessed in parallel by the plurality of processors (451, 453). Preferably, each of the one or more second/cached copies (441, 443) is in a separate memory area that can be used by one of the processors (451, 453) independent of the operation of other processors (451, 453).

Preferably, the first component (e.g., 421) of the firmware (104) is not allowed to change mapping, from logical addresses in one or more namespaces (e.g., 111, 221, 223) configured on the non-volatile storage media (109), to mapped logical addresses (257) in the capacity (220) of the non-volatile storage media (109). The first component (e.g., 421) of the firmware (104) uses its cached copy (441 or 443) to convert logical addresses in one or more namespaces (e.g., 111, 221, 223) configured on the non-volatile storage media (109) to mapped logical addresses (257) in the capacity (220) of the non-volatile storage media (109).

Preferably, the storage device (103) contains no more than a single running instance of any component (e.g., 225) of the firmware (104) that is allowed to change mapping from logical addresses defined in one or more namespaces (e.g., 111, 221, 223) configured on the non-volatile storage media (109), to mapped logical addresses (257) in the capacity (220) of the non-volatile storage media (109).

An active indicator (429) can be used by the firmware (104) to identify the first/active copy (425) as being active before the changes are implemented in the third, shadow copy (427), as illustrated in FIG. 21, and to identify the third/shadow copy (427) as being active after the changes are implemented in the third/shadow copy (427), as illustrated in FIG. 22.

In response to a change in the active indicator (429) (e.g., from FIG. 21 to FIG. 22), the firmware (104) causes the one or more running instances of the HIL cores (431, 433) to invalidate and/or update the one or more second cached copies (441, 443) for the one or more running instances of the HIL cores (431, 433) of the first component (e.g., 421) of the firmware (104).

Optionally, in response to implementing the changes in the third, shadow copy (427) while the first/active copy (425) is being identified as active, the firmware (104) causes the identification of a particular namespace (e.g., 111, 221, 223) and the transmission of a request to the one or more running instances of the HIL cores (431, 433) of the first component (e.g., 421) of the firmware (104) to pause or delay data access in the particular namespace (e.g., 111, 221, 223). The request is discarded after the second, cached copies (441, 443) are updated according to, for synchronization (453) with, the third/shadow copy (427).

In accordance with a data access policy configured in the storage device (103) and/or received from the host (101), the request may pause data write operations in the particular namespace (e.g., 111, 221, 223), but not data read operations in the particular namespace (e.g., 111, 221, 223), or pause data read operations in the particular namespace (e.g., 111, 221, 223), but not data write operations in the particular namespace (e.g., 111, 221, 223), or pause both read and write operations in the particular namespace (e.g., 111, 221, 223).

A non-transitory computer storage medium can be used to store instructions of the firmware (104). When the instructions are executed by the controller (107) of the computer storage device (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A solid state drive, comprising:
    random access memory;
    non-volatile storage media; and
    a controller having a plurality of processors, the controller configured to at least:
        store a first copy of a namespace map in the random access memory;
        configure the first copy of the namespace map as active;
        cache the first copy as one or more second copies in one or more processors in the plurality of processors;
        replicate, in the random access memory, the first copy as a third copy;
        change the third copy in the random access memory while the first copy is configured as active;
        configure the third copy as active and the first copy as inactive after the changing of the third copy in the random access memory; and
        update the one or more second copies in the one or more processors according to the third copy that is configured as active.

2. The solid state drive of claim 1, wherein the one or more processors are configured to map, using the one or more second copies, between:
    logical block addresses in one or more namespaces configured on the non-volatile storage media; and
    logical block addresses in a capacity of the non-volatile storage media.

3. The solid state drive of claim 2, wherein the one or more processors are configured to cache the one or more second copies in cache memory of the one or more processors.

4. The solid state drive of claim 3, wherein the controller is configured to update the one or more second copies cached in the one or more processors in accordance with a cache coherence protocol.

5. The solid state drive of claim 2, wherein the random access memory includes volatile dynamic random access memory.

6. The solid state drive of claim 2, wherein the one or more processors are not permitted to modify the one or more second copies other than updating according to a copy of the namespace map that is configured as active in the random access memory.

7. The solid state drive of claim 6, wherein no more than a single running instance of a component of firmware of the solid state drive is permitted to change a copy of the namespace map that is configured as inactive in the random access memory.

8. The solid state drive of claim 7, further comprising:
    an active indicator, wherein a copy of the namespace map in the random access memory identified by the active indicator is configured to be active.

9. The solid state drive of claim 8, wherein any copy in the random access memory that is not being identified by the active indicator is configured as inactive.

10. The solid state drive of claim 8, wherein in response to a change in the active indicator, the controller is configured to generate a request to pause or delay data access in a namespace.

11. The solid state drive of claim 10, wherein the request is discarded after the one or more second copies are updated according to the third copy.

12. The solid state drive of claim 11, wherein the controller is configured to generate the request in accordance with a data access policy configured in the solid state drive.

13. The solid state drive of claim 10, wherein the request causes a pause in data write operations in the particular namespace, but not in data read operations in the namespace.

14. The solid state drive of claim 10, wherein the request causes a pause in data read operations in the particular namespace, but not in data write operations in the namespace.

15. A method implemented in a solid state drive, the method comprising:
   storing a first copy of a namespace map in random access memory of the solid state drive;
   configuring the first copy as active;
   caching the first copy as one or more second copies in one or more processors of the solid state drive;
   replicating the first copy in the random access memory as a third copy;
   changing the third copy while the first copy is configured as active;
   configuring the third copy as active and the first copy as inactive after the changing of the third copy; and
   updating the one or more second copies in the one or more processors according to the third copy that is configured as active.

16. The method of claim 15, further comprising:
   mapping, using the one or more second copies of the namespace map, between:
      logical block addresses in one or more namespaces configured on non-volatile storage media of the solid state drive; and
      logical block addresses in a storage capacity of the solid state drive.

17. The method of claim 16, wherein the update of the one or more second copies cached in the one or more processors is in accordance with a cache coherence protocol; and the configuring the third copy as active and the first copy as inactive is performed by replacing, in an active indicator of the solid state drive, an identifier of the first copy with an identifier of the second copy.

18. A non-transitory computer storage medium storing instructions which, when executed in a solid state drive, cause the solid state drive to perform a method, the method comprising:
   storing a first copy of a namespace map in random access memory of the solid state drive;
   configuring the first copy as active;
   caching the first copy as one or more second copies in one or more processors of the solid state drive;
   replicating the first copy in the random access memory as a third copy;
   changing the third copy while the first copy is configured as active;
   configuring the third copy as active and the first copy as inactive after the changing of the third copy; and
   updating the one or more second copies in the one or more processors according to the third copy that is configured as active.

19. The non-transitory computer storage medium of claim 18, wherein the method further comprises:
   mapping, using the one or more second copies of the namespace map, between:
      logical block addresses in one or more namespaces configured on non-volatile storage media of the solid state drive; and
      logical block addresses in a storage capacity of the solid state drive.

20. The non-transitory computer storage medium of claim 19, wherein the configuring the third copy as active and the first copy as inactive comprises:
   configuring an active indicator to identify the third copy in the random access memory.

* * * * *